United States Patent
Li et al.

(10) Patent No.: US 12,137,476 B2
(45) Date of Patent: Nov. 5, 2024

(54) RANDOM ACCESS CHANNEL PROCEDURES WITH EXTERNAL ASSISTANCE

(71) Applicant: Qualcomm Incorporated, San Diego, CA (US)

(72) Inventors: Qiaoyu Li, Beijing (CN); Chao Wei, Beijing (CN); Hao Xu, Beijing (CN); Huilin Xu, Temecula, CA (US); Jing Lei, San Diego, CA (US); Peter Pui Lok Ang, San Diego, CA (US); Wanshi Chen, San Diego, CA (US); Le Liu, San Jose, CA (US); Yiqing Cao, Beijing (CN); Peter Gaal, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 347 days.

(21) Appl. No.: 17/776,640

(22) PCT Filed: Nov. 14, 2019

(86) PCT No.: PCT/CN2019/118320
§ 371 (c)(1),
(2) Date: May 13, 2022

(87) PCT Pub. No.: WO2021/092828
PCT Pub. Date: May 20, 2021

(65) Prior Publication Data
US 2022/0400513 A1     Dec. 15, 2022

(51) Int. Cl.
*H04W 74/04* (2009.01)
*H04W 74/00* (2009.01)
*H04W 74/0833* (2024.01)

(52) U.S. Cl.
CPC ......... *H04W 74/04* (2013.01); *H04W 74/006* (2013.01); *H04W 74/0833* (2013.01)

(58) Field of Classification Search
CPC .................................................. H04W 74/0833
See application file for complete search history.

(56) References Cited

U.S. PATENT DOCUMENTS

| 2015/0289080 A1 | 10/2015 | Wu |
| 2015/0334757 A1 | 11/2015 | Seo |

(Continued)

FOREIGN PATENT DOCUMENTS

| CN | 107535014 A | 1/2018 |
| WO | WO-2014201689 A1 | 12/2014 |

OTHER PUBLICATIONS

Interdigital Communications: "Completion of Initial Timing Alignment Procedure for SCells", 3GPP TSG-RAN WG2 #75bis, Tdoc R2-115408, Zhuhai, China, Oct. 10-14, 2011, pp. 1-5.

(Continued)

*Primary Examiner* — Zhiren Qin
(74) *Attorney, Agent, or Firm* — Holland & Hart LLP

(57) ABSTRACT

A low complexity user equipment (UE) may be in communication with another UE (e.g., with a premium UE or more capable UE) via a device-to-device communication link (e.g., via sidelink), and the low complexity UE may leverage the device-to-device link to improve (e.g., simplify, expedite, etc.) random access procedures performed by the low complexity UE. For example, a low complexity UE may request contention free random access (CFRA) resources via the device-to-device link with another UE. Another device (e.g., another UE in device-to-device communication with the low complexity UE) may receive the request from the low complexity UE and forward the request to the network (e.g., to a base station). The network may then configure CFRA resources for the low complexity UE. Upon receiving the CFRA configuration, the low complexity UE may per- (Continued)

form a random access procedure (e.g., a CFRA procedure) with the network (e.g., with the base station) accordingly.

35 Claims, 16 Drawing Sheets

(56) References Cited

U.S. PATENT DOCUMENTS

| | | | |
|---|---|---|---|
| 2015/0341974 A1 | 11/2015 | Wu et al. | |
| 2019/0037498 A1* | 1/2019 | Tseng | H04W 72/046 |
| 2019/0215872 A1 | 7/2019 | Park et al. | |

OTHER PUBLICATIONS

International Search Report and Written Opinion—PCT/CN2019/118320—ISA/EPO—Aug. 12, 2020.
Huawei, et al., "Correction to Contention Free Random Access", 3GPP TSG-RAN2 Meeting #99, 36321_CR1181R1_(REL-14)_R2-1709906_CFRA, 3rd Generation Partnership Project, Mobile Competence Centre, 650, Route Des Lucioles, F-06921 Sophia-Antipolis Cedex, France, vol. RAN WG2, No. Berlin, Germany, Aug. 21, 2017-Aug. 25, 2017, Sep. 10, 2017, 10 Pages, XP051323232, p. 3-p. 5.
Supplementary European Search Report—19952190—Search Authority—The Hague—Jul. 11, 2023.

* cited by examiner

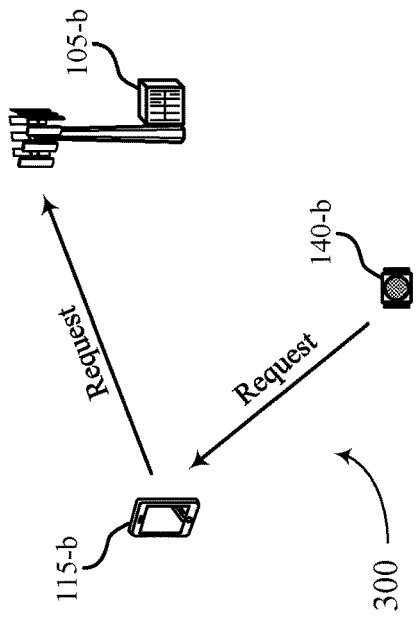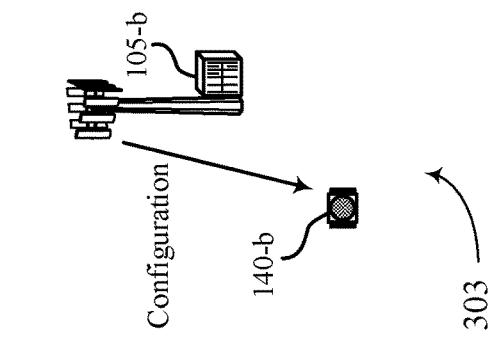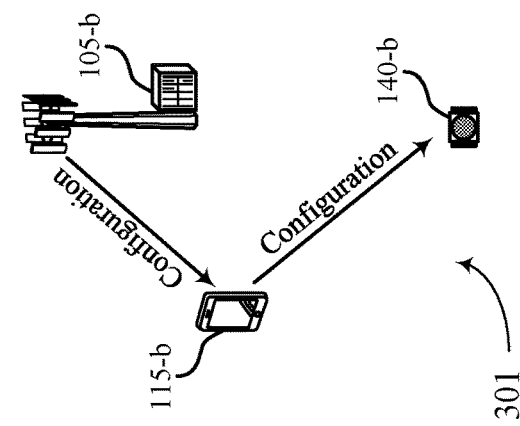
FIG. 3A
FIG. 3B

RANDOM ACCESS CHANNEL PROCEDURES WITH EXTERNAL ASSISTANCE

CROSS REFERENCE

The present application is a 371 national stage filing of International PCT Application No. PCT/CN2019/118320 by Li et al., entitled "RANDOM ACCESS CHANNEL PROCEDURES WITH EXTERNAL ASSISTANCE," filed Nov. 14, 2019, which is assigned to the assignee hereof, and which is expressly incorporated by reference in its entirety herein.

BACKGROUND

The following relates generally to wireless communications, and more specifically to random access channel procedures with external assistance.

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal frequency division multiple access (OFDMA), or discrete Fourier transform spread orthogonal frequency division multiplexing (DFT-S-OFDM). A wireless multiple-access communications system may include a number of base stations or network access nodes, each simultaneously supporting communication for multiple communication devices, which may be otherwise known as user equipment (UE).

Some wireless communications systems may support one or more random access procedures (e.g., a UE may perform a random access procedure during initial access to establish a connection with the network). The random access procedures may involve a series of handshake messages exchanged between UEs and base stations using random access time/frequency resources. Random access procedures may include contention based random access (CBRA) procedures where the device must contend for the channel before attempting access and contention free random access (CFRA) procedures where resources are preconfigured for the device. In some aspects, the random access procedures may be performed on a physical random access channel (PRACH) and may involve exchanging one or more random access channel (RACH) signals (e.g., a RACH message 1 (msg1), RACH message 2 (msg2), and the like).

SUMMARY

The described techniques relate to improved methods, systems, devices, and apparatuses that support random access channel procedures with external assistance. Generally, the described techniques provide for improved random access procedures for user equipment (UEs) with reduced capabilities (e.g., such as for low complexity UEs, low tier UEs, New Radio (NR)-Light devices, Internet of Things (IoT) devices, etc.). According to some aspects, a low complexity UE may leverage external assistance from other UEs (e.g., via device-to-device communications) to improve random access procedures for the low complexity UE.

For example, a low complexity UE may be in communication with another UE (e.g., with a premium UE or more capable UE) via a device-to-device communication link (e.g., via sidelink), and the low complexity UE may leverage the device-to-device link to improve (e.g., simplify, expedite, etc.) random access procedures performed by the low complexity UE. As such, according to the techniques described herein, a low complexity UE may request contention free random access (CFRA) resources via the device-to-device link with another UE. In some cases, the request may include a reason for the request (e.g., a condition of the low complexity UE), preferred CFRA resources, etc. Another device (e.g., another UE in device-to-device communication with the low complexity UE) may receive the request from the low complexity UE and forward the request to the network (e.g., to a base station). The network may then configure CFRA resources for the low complexity UE, and may transmit the CFRA configuration directly to the low complexity UE, may transmit the CFRA configuration to the low complexity UE through another UE (e.g., through some other UE for forwarding to the low complexity UE), etc. Upon receiving the CFRA configuration, the low complexity UE may perform a random access procedure (e.g., a CFRA procedure) with the network (e.g., with the base station) accordingly.

A method of wireless communication at a first UE is described. The method may include transmitting a request for contention free random access resources to a second UE based on a low power capability of the first UE, receiving a contention free random access configuration based on the request, and performing a contention free random access procedure with a base station based on the received contention free random access configuration.

An apparatus for wireless communication at a first UE is described. The apparatus may include a processor, memory coupled with the processor, and instructions stored in the memory. The instructions may be executable by the processor to cause the apparatus to transmit a request for contention free random access resources to a second UE based on a low power capability of the first UE, receive a contention free random access configuration based on the request, and perform a contention free random access procedure with a base station based on the received contention free random access configuration.

Another apparatus for wireless communication at a first UE is described. The apparatus may include means for transmitting a request for contention free random access resources to a second UE based on a low power capability of the first UE, receiving a contention free random access configuration based on the request, and performing a contention free random access procedure with a base station based on the received contention free random access configuration.

A non-transitory computer-readable medium storing code for wireless communication at a first UE is described. The code may include instructions executable by a processor to transmit a request for contention free random access resources to a second UE based on a low power capability of the first UE, receive a contention free random access configuration based on the request, and perform a contention free random access procedure with a base station based on the received contention free random access configuration.

Some examples of the method, apparatuses, and non-transitory computer-readable medium described herein may further include operations, features, means, or instructions for determining to request the contention free random access resources based on a contention based random access configuration of the first UE, the low power capability of the first UE, a capability of the first UE to communicate with the second UE over a device-to-device link, or some combination thereof, where the request may be transmitted based on the determination. In some examples of the method, apparatuses, and non-transitory computer-readable medium described herein, the request includes an indication of the contention based random access configuration of the first UE, the low power capability of the first UE, the capability of the first UE to communicate with the second UE over a device-to-device link, or some combination thereof.

In some examples of the method, apparatuses, and non-transitory computer-readable medium described herein, receiving the contention free random access configuration may include operations, features, means, or instructions for receiving the contention free random access configuration from the second UE. In some examples of the method, apparatuses, and non-transitory computer-readable medium described herein, receiving the contention free random access configuration may include operations, features, means, or instructions for receiving the contention free random access configuration from the base station. In some examples of the method, apparatuses, and non-transitory computer-readable medium described herein, receiving the contention free random access configuration may include operations, features, means, or instructions for receiving the contention free random access configuration from a third UE. In some examples of the method, apparatuses, and non-transitory computer-readable medium described herein, the request includes an identifier of the first UE and the contention free random access configuration may be received by the first UE based on the identifier.

In some examples of the method, apparatuses, and non-transitory computer-readable medium described herein, the identifier includes a cell radio network temporary identifier of the first UE. In some examples of the method, apparatuses, and non-transitory computer-readable medium described herein, the contention free random access configuration includes a random access time resource, a random access frequency resource, a random access preamble, a random access occasion, or some combination thereof. In some examples of the method, apparatuses, and non-transitory computer-readable medium described herein, the contention free random access configuration includes one or more synchronization signal block indices, one or more channel state information reference signal resource identifications, or some combination thereof associated with the random access time resource, the random access frequency resource, the random access preamble, the random access occasion, or some combination thereof. Some examples of the method, apparatuses, and non-transitory computer-readable medium described herein may further include operations, features, means, or instructions for determining a preferred random access resource, a preferred random access preamble, a preferred random access occasion, or some combination thereof, where the request includes an indication of the preferred random access resource, the preferred random access preamble, the preferred random access occasion, or some combination thereof.

Some examples of the method, apparatuses, and non-transitory computer-readable medium described herein may further include operations, features, means, or instructions for determining one or more preferred synchronization signal block indices, one or more channel state information reference signal resource identifications, or some combination thereof associated with the preferred random access resource, the preferred random access preamble, the preferred random access occasion, or some combination thereof, where the request includes the determined one or more preferred synchronization signal block indices, the one or more channel state information reference signal resource identifications, or some combination thereof. Some examples of the method, apparatuses, and non-transitory computer-readable medium described herein may further include operations, features, means, or instructions for determining whether the contention free random access resources may be for a four-step random access channel procedure, a two-step random access channel procedure, or both, where the request includes an indication of the determination.

In some examples of the method, apparatuses, and non-transitory computer-readable medium described herein, the contention free random access configuration includes an indication of whether the contention free random access configuration may be for a four-step random access channel procedure, a two-step random access channel procedure, or both. In some examples of the method, apparatuses, and non-transitory computer-readable medium described herein, performing the contention free random access procedure with the base station may include operations, features, means, or instructions for transmitting a random access channel preamble at a random access occasion based on the received contention free random access configuration. Some examples of the method, apparatuses, and non-transitory computer-readable medium described herein may further include operations, features, means, or instructions for determining to request the contention free random access resources based on a condition of the first UE, where the request includes an indication of the condition.

In some examples of the method, apparatuses, and non-transitory computer-readable medium described herein, the condition includes an initial access from idle mode condition, a radio resource connection re-establishment procedure for radio link failure recovery, a downlink data arrival during connected mode when uplink synchronization may be lost when contention free random access may be not configured, an uplink data arrival during connected mode when uplink synchronization may be lost when contention free random access may be not configured, uplink data arrival during connected mode when a physical uplink control channel resource for a scheduling request may be unavailable, a scheduling request failure, a request by radio resource control upon synchronous reconfiguration for handover when contention free random access may be not configured for handover, a transition from a first UE inactive mode, an establishment of time alignment for a secondary timing advance group, a request for other system information, a beam failure recovery when contention free random access may be not configured for beam failure recovery, or some combination thereof.

In some examples of the method, apparatuses, and non-transitory computer-readable medium described herein, the request may be transmitted over a device-to-device link with the second UE.

A method of wireless communication at a second UE is described. The method may include receiving, from a first UE over a device-to-device link, a request for contention free random access resources based on a low power capability of the first UE and transmitting the request to a base station based on the received request.

An apparatus for wireless communication at a second UE is described. The apparatus may include a processor, memory coupled with the processor, and instructions stored in the memory. The instructions may be executable by the processor to cause the apparatus to receive, from a first UE over a device-to-device link, a request for contention free random access resources based on a low power capability of the first UE and transmit the request to a base station based on the received request.

Another apparatus for wireless communication at a second UE is described. The apparatus may include means for receiving, from a first UE over a device-to-device link, a request for contention free random access resources based on a low power capability of the first UE and transmitting the request to a base station based on the received request.

A non-transitory computer-readable medium storing code for wireless communication at a second UE is described. The code may include instructions executable by a processor to receive, from a first UE over a device-to-device link, a request for contention free random access resources based on a low power capability of the first UE and transmit the request to a base station based on the received request.

Some examples of the method, apparatuses, and non-transitory computer-readable medium described herein may further include operations, features, means, or instructions for receiving a contention free random access configuration from the base station based on the transmitted request, and transmitting, to the first UE over the device-to-device link, the contention free random access configuration. In some examples of the method, apparatuses, and non-transitory computer-readable medium described herein, the request includes an identifier of the first UE. In some examples of the method, apparatuses, and non-transitory computer-readable medium described herein, the identifier of the first UE includes a cell radio network temporary identifier of the first UE. In some examples of the method, apparatuses, and non-transitory computer-readable medium described herein, the contention free random access configuration includes a random access time resource, a random access frequency resource, a random access preamble, a random access occasion, or some combination thereof.

In some examples of the method, apparatuses, and non-transitory computer-readable medium described herein, the contention free random access configuration includes one or more synchronization signal block indices, one or more channel state information reference signal resource identifications, or some combination thereof associated with the random access time resource, the random access frequency resource, the random access preamble, the random access occasion, or some combination thereof. In some examples of the method, apparatuses, and non-transitory computer-readable medium described herein, the contention free random access configuration includes an indication of whether the contention free random access configuration may be for a four-step random access channel procedure, a two-step random access channel procedure, or both.

In some examples of the method, apparatuses, and non-transitory computer-readable medium described herein, the request includes an indication of a contention based random access configuration of the first UE, the low power capability of the first UE, a capability of the first UE to communicate with the second UE over the device-to-device link, or some combination thereof. In some examples of the method, apparatuses, and non-transitory computer-readable medium described herein, the request includes an indication of a preferred random access resource for the first UE, a preferred random access preamble for the first UE, a preferred random access occasion for the first UE, or some combination thereof. In some examples of the method, apparatuses, and non-transitory computer-readable medium described herein, the request includes one or more preferred synchronization signal block indices for the first UE, one or more channel state information reference signal resource identifications for the first UE, or some combination thereof.

In some examples of the method, apparatuses, and non-transitory computer-readable medium described herein, the request includes an indication of whether the contention free random access resources may be for a four-step random access channel procedure, a two-step random access channel procedure, or both. In some examples of the method, apparatuses, and non-transitory computer-readable medium described herein, the request includes an indication a condition of the first UE. In some examples of the method, apparatuses, and non-transitory computer-readable medium described herein, the condition includes an initial access from idle mode condition, a radio resource connection re-establishment procedure for radio link failure recovery, a downlink data arrival during connected mode when uplink synchronization may be lost when contention free random access may be not configured, an uplink data arrival during connected mode when uplink synchronization may be lost when contention free random access may be not configured, uplink data arrival during connected mode when a physical uplink control channel resource for a scheduling request may be unavailable, a scheduling request failure, a request by radio resource control upon synchronous reconfiguration for handover when contention free random access may be not configured for handover, a transition from a first UE inactive mode, an establishment of time alignment for a secondary timing advance group, a request for other system information, a beam failure recovery when contention free random access may be not configured for beam failure recovery, or some combination thereof.

BRIEF DESCRIPTION OF THE DRAWINGS

FIGS. 3A and 3B illustrate example communication diagrams that support random access channel procedures with external assistance in accordance with aspects of the present disclosure.

DETAILED DESCRIPTION

Figure 1:
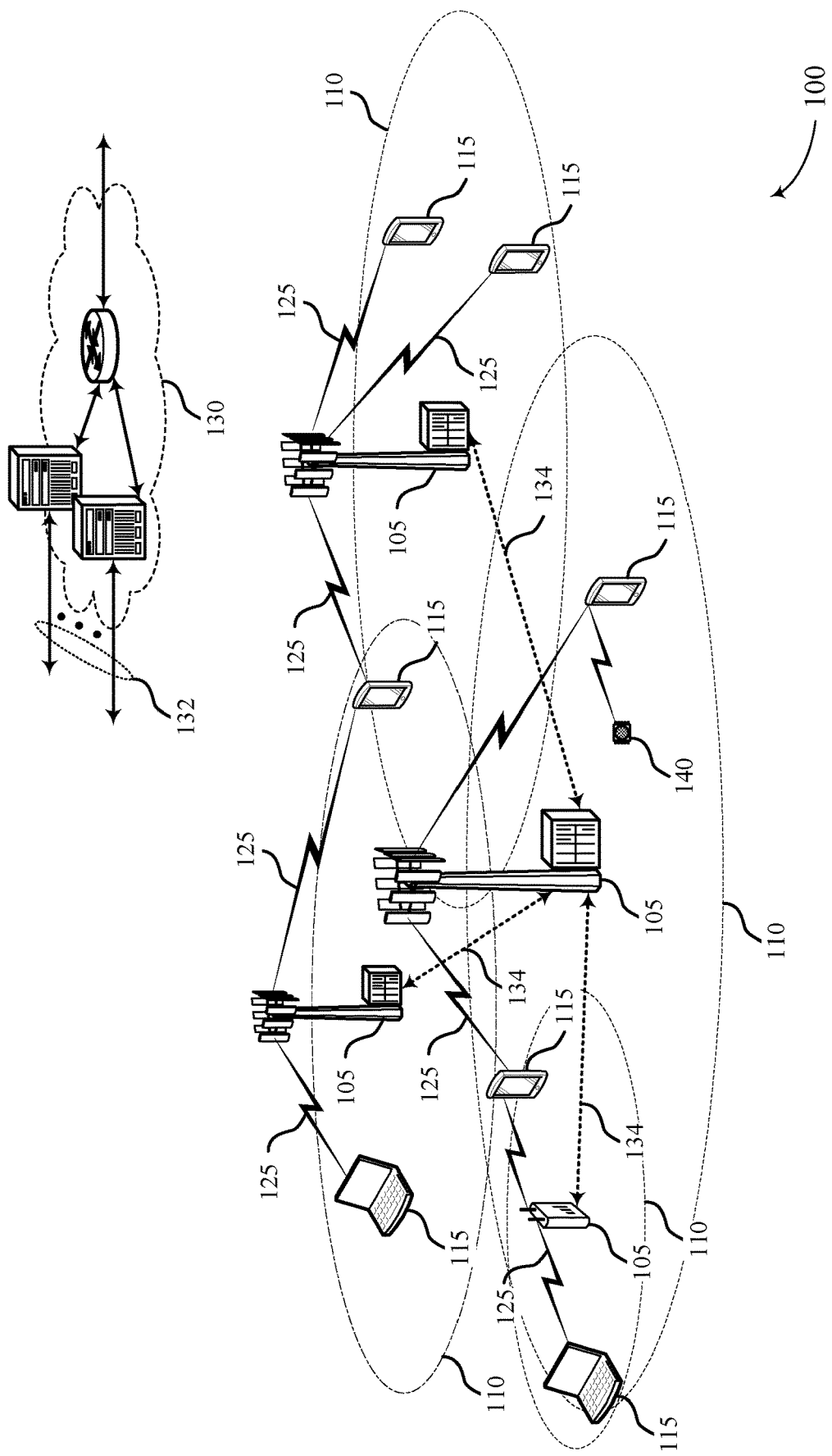
FIG. 1 illustrates an example of a system for wireless communications that supports random access channel procedures with external assistance in accordance with aspects of the present disclosure.

Some wireless communications systems may support low complexity user equipment (UEs) (e.g., which may be referred to as Light devices, New Radio (NR)-Light devices, low tier devices, Internet of Things (IoT) devices, etc.). A low complexity UE may also be referred to as a low tier UE for which some features, or premium features, may not be needed or useful. For example, low complexity UEs may include sensors (e.g., industrial sensors), cameras (e.g., video monitoring devices), wearable devices, IoT devices, low tier or relaxed devices, etc. Such low complexity UEs may be used in a variety of applications, including healthcare, smart cities, transportation and logistics, electricity distribution, process automation, and building automation. Low complexity UEs may communicate with a base station and operate in the same cell as other, non-low complexity UEs (e.g., which may be referred to as regular UEs, premium UEs, etc.). For example, in some cases, a low complexity UE may be connected to a network via a connection to a base station, in addition to being connected to other UEs (e.g., to one or more premium UEs) via device-to-device (e.g., sidelink) connections.

As such, in some cases, a low complexity UE may perform random access procedures (e.g., to establish a connection with a base station, to achieve uplink synchronization with the base station, etc.). The random access procedure may include a series of handshake messages carrying information that facilitates establishing the connection between the UE and the base station. For example, a network may implement periodic and/or aperiodic time/frequency resources that UEs (e.g., including low complexity UEs) may use to perform random access procedures. Random access procedures may include contention based random access (CBRA) procedures (e.g., where the device contends for the channel for random access procedure signaling) as well as contention free random access (CFRA) procedures (e.g., where time/frequency resources are preconfigured for the UE to conduct random access procedure signaling).

However, in some cases, low complexity UEs may be configured with reduced capabilities that may result in inefficient random access procedures. For example, a low complexity UE may be configured to transmit with a reduced transmit power compared to other non-low complexity devices (e.g., compared to other premium UEs that may operate in same cell as the low complexity UE). For example, the uplink transmit power of a low complexity UE may have a transmission power capability of, for example, 10 decibels (dBs) less than that of a premium UE. As such, low complexity UEs configured with CBRA procedures (e.g., where the low complexity UE contends for the channel amongst other higher powered premium UEs) may have difficulty or may be unable to successfully perform such CBRA procedures (e.g., low complexity UE CBRA procedures may be associated with network connection latency, poor network connections, etc.).

According to the techniques described herein, low complexity UEs may leverage external assistance from other UEs (e.g., via device-to-device communications) to improve random access procedures. For example, a low complexity UE may be in communication with another UE (e.g., with a premium UE or more capable UE) via a device-to-device communication link (e.g., via sidelink), and the low complexity UE may leverage the device-to-device link to improve (e.g., simplify, expedite, etc.) random access procedures performed by the low complexity UE. For instance, according to the techniques described herein, a low complexity UE may request CFRA resources via a device-to-device link with another UE. In some cases, the request may include a reason for the request (e.g., a condition of the low complexity UE), preferred CFRA resources, etc. The assisting UE (e.g., another UE in device-to-device communication with the low complexity UE) may receive the request from the low complexity UE and forward the request to the network (e.g., to a base station). The network may then configure CFRA resources for the low complexity UE, and may transmit the CFRA configuration directly to the low complexity UE, may transmit the CFRA configuration to the low complexity UE through another UE (e.g., through some other UE for forwarding to the low complexity UE), etc. Upon receiving the CFRA configuration, the low complexity UE may perform a random access procedure (e.g., a CFRA procedure) with the network (e.g., with the base station) accordingly.

The described techniques may provide for improved random access configuration and more efficient random access procedures that may allow low complexity UEs to maintain their intended benefits (e.g., power savings). For example, low complexity UEs may request CFRA resources (e.g., via a device-to-device link with a premium UE) and receive a CFRA configuration to increase the likelihood of successful random access procedures with a base station (e.g., which may result in more efficient random access procedures, which may further result in reduced latency and improved network connections relative to other CBRA procedures performed by low complexity UEs). Further, low complexity UE leveraging of external assistance from other UEs (e.g., from a connected premium UE) may result in improved likelihood of successful communication of such requests for CFRA resources to a base station (e.g., as a connected premium UE may more efficiently request CFRA resources on behalf of the low complexity UE that may be associated with reduced transmit power capabilities).

Aspects of the disclosure are initially described in the context of a wireless communications system. Example communication diagrams and an example process flow illustrating aspects of the discussed techniques are then described. Aspects of the disclosure are further illustrated by and described with reference to apparatus diagrams, system diagrams, and flowcharts that relate to random access channel procedures with external assistance.

FIG. 1 illustrates an example of a wireless communications system 100 that supports random access channel procedures with external assistance in accordance with aspects of the present disclosure. The wireless communications system 100 includes base stations 105, UEs 115, and a core network 130. In some examples, the wireless communications system 100 may be a Long Term Evolution (LTE) network, an LTE-Advanced (LTE-A) network, an LTE-A Pro network, or a New Radio (NR) network. In some cases, wireless communications system 100 may support enhanced broadband communications, ultra-reliable (e.g., mission critical) communications, low latency communications, or communications with low-cost and low-complexity devices.

Base stations 105 may wirelessly communicate with UEs 115 via one or more base station antennas. Base stations 105 described herein may include or may be referred to by those skilled in the art as a base transceiver station, a radio base station, an access point, a radio transceiver, a NodeB, an eNodeB (eNB), a next-generation NodeB or giga-NodeB (either of which may be referred to as a gNB), a Home NodeB, a Home eNodeB, or some other suitable terminology. Wireless communications system 100 may include base stations 105 of different types (e.g., macro or small cell base stations). The UEs 115 described herein may be able to communicate with various types of base stations 105 and network equipment including macro eNBs, small cell eNBs, gNBs, relay base stations, and the like.

Each base station 105 may be associated with a particular geographic coverage area 110 in which communications with various UEs 115 is supported. Each base station 105 may provide communication coverage for a respective geographic coverage area 110 via communication links 125, and communication links 125 between a base station 105 and a UE 115 may utilize one or more carriers. Communication links 125 shown in wireless communications system 100 may include uplink transmissions from a UE 115 to a base station 105, or downlink transmissions from a base station 105 to a UE 115. Downlink transmissions may also be called forward link transmissions while uplink transmissions may also be called reverse link transmissions.

The geographic coverage area 110 for a base station 105 may be divided into sectors making up a portion of the geographic coverage area 110, and each sector may be associated with a cell. For example, each base station 105 may provide communication coverage for a macro cell, a small cell, a hot spot, or other types of cells, or various combinations thereof. In some examples, a base station 105 may be movable and therefore provide communication coverage for a moving geographic coverage area 110. In some examples, different geographic coverage areas 110 associated with different technologies may overlap, and overlapping geographic coverage areas 110 associated with different technologies may be supported by the same base station 105 or by different base stations 105. The wireless communications system 100 may include, for example, a heterogeneous LTE/LTE-A/LTE-A Pro or NR network in which different types of base stations 105 provide coverage for various geographic coverage areas 110.

The term "cell" refers to a logical communication entity used for communication with a base station 105 (e.g., over a carrier), and may be associated with an identifier for distinguishing neighboring cells (e.g., a physical cell identifier (PCID), a virtual cell identifier (VCID)) operating via the same or a different carrier. In some examples, a carrier may support multiple cells, and different cells may be configured according to different protocol types (e.g., machine-type communication (MTC), narrowband Internet-of-Things (NB-IoT), enhanced mobile broadband (eMBB), or others) that may provide access for different types of devices. In some cases, the term "cell" may refer to a portion of a geographic coverage area 110 (e.g., a sector) over which the logical entity operates.

UEs 115 may be dispersed throughout the wireless communications system 100, and each UE 115 may be stationary or mobile. A UE 115 may also be referred to as a mobile device, a wireless device, a remote device, a handheld device, or a subscriber device, or some other suitable terminology, where the "device" may also be referred to as a unit, a station, a terminal, or a client. A UE 115 may also be a personal electronic device such as a cellular phone, a personal digital assistant (PDA), a tablet computer, a laptop computer, or a personal computer. In some examples, a UE 115 may also refer to a wireless local loop (WLL) station, an Internet of Things (IoT) device, an Internet of Everything (IoE) device, or an MTC device, or the like, which may be implemented in various articles such as appliances, vehicles, meters, or the like.

Some UEs 115, such as MTC or IoT devices, may be low cost or low complexity devices, and may provide for automated communication between machines (e.g., via Machine-to-Machine (M2M) communication). M2M communication or MTC may refer to data communication technologies that allow devices to communicate with one another or a base station 105 without human intervention. In some examples, M2M communication or MTC may include communications from devices that integrate sensors or meters to measure or capture information and relay that information to a central server or application program that can make use of the information or present the information to humans interacting with the program or application. Some UEs 115 may be designed to collect information or enable automated behavior of machines. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

Some UEs 115 may be configured to employ operating modes that reduce power consumption, such as half-duplex communications (e.g., a mode that supports one-way communication via transmission or reception, but not transmission and reception simultaneously). In some examples half-duplex communications may be performed at a reduced peak rate. Other power conservation techniques for UEs 115 include entering a power saving "deep sleep" mode when not engaging in active communications, or operating over a limited bandwidth (e.g., according to narrowband communications). In some cases, UEs 115 may be designed to support critical functions (e.g., mission critical functions), and a wireless communications system 100 may be configured to provide ultra-reliable communications for these functions.

In some cases, a UE 115 may also be able to communicate directly with other UEs 115 (e.g., using a peer-to-peer (P2P) or device-to-device (D2D) protocol). One or more of a group of UEs 115 utilizing D2D communications may be within the geographic coverage area 110 of a base station 105. Other UEs 115 in such a group may be outside the geographic coverage area 110 of a base station 105, or be otherwise unable to receive transmissions from a base station 105. In some cases, groups of UEs 115 communicating via D2D communications may utilize a one-to-many (1:M) system in which each UE 115 transmits to every other UE 115 in the group. In some cases, a base station 105 facilitates the scheduling of resources for D2D communications. In other cases, D2D communications are carried out between UEs 115 without the involvement of a base station 105.

Base stations 105 may communicate with the core network 130 and with one another. For example, base stations 105 may interface with the core network 130 through backhaul links 132 (e.g., via an S1, N2, N3, or other interface). Base stations 105 may communicate with one another over backhaul links 134 (e.g., via an X2, Xn, or other interface) either directly (e.g., directly between base stations 105) or indirectly (e.g., via core network 130).

The core network 130 may provide user authentication, access authorization, tracking, Internet Protocol (IP) connectivity, and other access, routing, or mobility functions. The core network 130 may be an evolved packet core (EPC), which may include at least one mobility management entity (MME), at least one serving gateway (S-GW), and at least one Packet Data Network (PDN) gateway (P-GW). The MME may manage non-access stratum (e.g., control plane) functions such as mobility, authentication, and bearer management for UEs 115 served by base stations 105 associated with the EPC. User IP packets may be transferred through the S-GW, which itself may be connected to the P-GW. The P-GW may provide IP address allocation as well as other functions. The P-GW may be connected to the network operators IP services. The operators IP services may include access to the Internet, Intranet(s), an IP Multimedia Subsystem (IMS), or a Packet-Switched (PS) Streaming Service.

At least some of the network devices, such as a base station 105, may include subcomponents such as an access network entity, which may be an example of an access node controller (ANC). Each access network entity may communicate with UEs 115 through a number of other access network transmission entities, which may be referred to as a radio head, a smart radio head, or a transmission/reception point (TRP). In some configurations, various functions of each access network entity or base station 105 may be distributed across various network devices (e.g., radio heads and access network controllers) or consolidated into a single network device (e.g., a base station 105).

Wireless communications system 100 may operate using one or more frequency bands, typically in the range of 300 megahertz (MHz) to 300 gigahertz (GHz). Generally, the region from 300 MHz to 3 GHz is known as the ultra-high frequency (UHF) region or decimeter band, since the wavelengths range from approximately one decimeter to one meter in length. UHF waves may be blocked or redirected by buildings and environmental features. However, the waves may penetrate structures sufficiently for a macro cell to provide service to UEs 115 located indoors. Transmission of UHF waves may be associated with smaller antennas and shorter range (e.g., less than 100 km) compared to transmission using the smaller frequencies and longer waves of the high frequency (HF) or very high frequency (VHF) portion of the spectrum below 300 MHz.

Wireless communications system 100 may also operate in a super high frequency (SHF) region using frequency bands from 3 GHz to 30 GHz, also known as the centimeter band. The SHF region includes bands such as the 5 GHz industrial, scientific, and medical (ISM) bands, which may be used opportunistically by devices that may be capable of tolerating interference from other users.

Wireless communications system 100 may also operate in an extremely high frequency (EHF) region of the spectrum (e.g., from 30 GHz to 300 GHz), also known as the millimeter band. In some examples, wireless communications system 100 may support millimeter wave (mmW) communications between UEs 115 and base stations 105, and EHF antennas of the respective devices may be even smaller and more closely spaced than UHF antennas. In some cases, this may facilitate use of antenna arrays within a UE 115. However, the propagation of EHF transmissions may be subject to even greater atmospheric attenuation and shorter range than SHF or UHF transmissions. Techniques disclosed herein may be employed across transmissions that use one or more different frequency regions, and designated use of bands across these frequency regions may differ by country or regulating body.

In some cases, wireless communications system 100 may utilize both licensed and unlicensed radio frequency spectrum bands. For example, wireless communications system 100 may employ License Assisted Access (LAA), LTE-Unlicensed (LTE-U) radio access technology, or NR technology in an unlicensed band such as the 5 GHz ISM band. When operating in unlicensed radio frequency spectrum bands, wireless devices such as base stations 105 and UEs 115 may employ listen-before-talk (LBT) procedures to ensure a frequency channel is clear before transmitting data. In some cases, operations in unlicensed bands may be based on a carrier aggregation configuration in conjunction with component carriers operating in a licensed band (e.g., LAA). Operations in unlicensed spectrum may include downlink transmissions, uplink transmissions, peer-to-peer transmissions, or a combination of these. Duplexing in unlicensed spectrum may be based on frequency division duplexing (FDD), time division duplexing (TDD), or a combination of both.

In some examples, base station 105 or UE 115 may be equipped with multiple antennas, which may be used to employ techniques such as transmit diversity, receive diversity, multiple-input multiple-output (MIMO) communications, or beamforming. For example, wireless communications system 100 may use a transmission scheme between a transmitting device (e.g., a base station 105) and a receiving device (e.g., a UE 115), where the transmitting device is equipped with multiple antennas and the receiving device is equipped with one or more antennas. MIMO communications may employ multipath signal propagation to increase the spectral efficiency by transmitting or receiving multiple signals via different spatial layers, which may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream, and may carry bits associated with the same data stream (e.g., the same codeword) or different data streams. Different spatial layers may be associated with different antenna ports used for channel measurement and reporting. MIMO techniques include single-user MIMO (SU-MIMO) where multiple spatial layers are transmitted to the same receiving device, and multiple-user MIMO (MU-MIMO) where multiple spatial layers are transmitted to multiple devices.

Beamforming, which may also be referred to as spatial filtering, directional transmission, or directional reception, is a signal processing technique that may be used at a transmitting device or a receiving device (e.g., a base station 105 or a UE 115) to shape or steer an antenna beam (e.g., a transmit beam or receive beam) along a spatial path between the transmitting device and the receiving device. Beamforming may be achieved by combining the signals communicated via antenna elements of an antenna array such that signals propagating at particular orientations with respect to an antenna array experience constructive interference while others experience destructive interference. The adjustment of signals communicated via the antenna elements may include a transmitting device or a receiving device applying certain amplitude and phase offsets to signals carried via each of the antenna elements associated with the device. The adjustments associated with each of the antenna elements may be defined by a beamforming weight set associated with a particular orientation (e.g., with respect to the antenna array of the transmitting device or receiving device, or with respect to some other orientation).

In one example, a base station 105 may use multiple antennas or antenna arrays to conduct beamforming operations for directional communications with a UE 115. For instance, some signals (e.g. synchronization signals, reference signals, beam selection signals, or other control signals) may be transmitted by a base station 105 multiple times in different directions, which may include a signal being transmitted according to different beamforming weight sets associated with different directions of transmission. Transmissions in different beam directions may be used to identify (e.g., by the base station 105 or a receiving device, such as a UE 115) a beam direction for subsequent transmission and/or reception by the base station 105.

Some signals, such as data signals associated with a particular receiving device, may be transmitted by a base station 105 in a single beam direction (e.g., a direction associated with the receiving device, such as a UE 115). In some examples, the beam direction associated with transmissions along a single beam direction may be determined based at least in in part on a signal that was transmitted in different beam directions. For example, a UE 115 may receive one or more of the signals transmitted by the base station 105 in different directions, and the UE 115 may report to the base station 105 an indication of the signal it received with a highest signal quality, or an otherwise acceptable signal quality. Although these techniques are described with reference to signals transmitted in one or more directions by a base station 105, a UE 115 may employ similar techniques for transmitting signals multiple times in different directions (e.g., for identifying a beam direction for subsequent transmission or reception by the UE 115), or transmitting a signal in a single direction (e.g., for transmitting data to a receiving device).

A receiving device (e.g., a UE 115, which may be an example of a mmW receiving device) may try multiple receive beams when receiving various signals from the base station 105, such as synchronization signals, reference signals, beam selection signals, or other control signals. For example, a receiving device may try multiple receive directions by receiving via different antenna subarrays, by processing received signals according to different antenna subarrays, by receiving according to different receive beamforming weight sets applied to signals received at a plurality of antenna elements of an antenna array, or by processing received signals according to different receive beamforming weight sets applied to signals received at a plurality of antenna elements of an antenna array, any of which may be referred to as "listening" according to different receive beams or receive directions. In some examples a receiving device may use a single receive beam to receive along a single beam direction (e.g., when receiving a data signal). The single receive beam may be aligned in a beam direction determined based at least in part on listening according to different receive beam directions (e.g., a beam direction determined to have a highest signal strength, highest signal-to-noise ratio, or otherwise acceptable signal quality based at least in part on listening according to multiple beam directions).

In some cases, the antennas of a base station 105 or UE 115 may be located within one or more antenna arrays, which may support MIMO operations, or transmit or receive beamforming. For example, one or more base station antennas or antenna arrays may be co-located at an antenna assembly, such as an antenna tower. In some cases, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations.

In some cases, wireless communications system 100 may be a packet-based network that operate according to a layered protocol stack. In the user plane, communications at the bearer or Packet Data Convergence Protocol (PDCP) layer may be IP-based. A Radio Link Control (RLC) layer may perform packet segmentation and reassembly to communicate over logical channels. A Medium Access Control (MAC) layer may perform priority handling and multiplexing of logical channels into transport channels. The MAC layer may also use hybrid automatic repeat request (HARQ) to provide retransmission at the MAC layer to improve link efficiency. In the control plane, the Radio Resource Control (RRC) protocol layer may provide establishment, configuration, and maintenance of an RRC connection between a UE 115 and a base station 105 or core network 130 supporting radio bearers for user plane data. At the Physical layer, transport channels may be mapped to physical channels.

In some cases, UEs 115 and base stations 105 may support retransmissions of data to increase the likelihood that data is received successfully. HARQ feedback is one technique of increasing the likelihood that data is received correctly over a communication link 125. HARQ may include a combination of error detection (e.g., using a cyclic redundancy check (CRC)), forward error correction (FEC), and retransmission (e.g., automatic repeat request (ARQ)). HARQ may improve throughput at the MAC layer in poor radio conditions (e.g., signal-to-noise conditions). In some cases, a wireless device may support same-slot HARQ feedback, where the device may provide HARQ feedback in a specific slot for data received in a previous symbol in the slot. In other cases, the device may provide HARQ feedback in a subsequent slot, or according to some other time interval.

Time intervals in LTE or NR may be expressed in multiples of a basic time unit, which may, for example, refer to a sampling period of $T_s = 1/30,720,000$ seconds. Time intervals of a communications resource may be organized according to radio frames each having a duration of 10 milliseconds (ms), where the frame period may be expressed as $T_f = 307,200\ T_s$. The radio frames may be identified by a system frame number (SFN) ranging from 0 to 1023. Each frame may include 10 subframes numbered from 0 to 9, and each subframe may have a duration of 1 ms. A subframe may be further divided into 2 slots each having a duration of 0.5 ms, and each slot may contain 6 or 7 modulation symbol periods (e.g., depending on the length of the cyclic prefix prepended to each symbol period). Excluding the cyclic prefix, each symbol period may contain 2048 sampling periods. In some cases, a subframe may be the smallest scheduling unit of the wireless communications system 100, and may be referred to as a transmission time interval (TTI). In other cases, a smallest scheduling unit of the wireless communications system 100 may be shorter than a subframe or may be dynamically selected (e.g., in bursts of shortened TTIs (sTTIs) or in selected component carriers using sTTIs).

In some wireless communications systems, a slot may further be divided into multiple mini-slots containing one or more symbols. In some instances, a symbol of a mini-slot or a mini-slot may be the smallest unit of scheduling. Each symbol may vary in duration depending on the subcarrier spacing or frequency band of operation, for example. Further, some wireless communications systems may implement slot aggregation in which multiple slots or mini-slots are aggregated together and used for communication between a UE 115 and a base station 105.

The term "carrier" refers to a set of radio frequency spectrum resources having a defined physical layer structure for supporting communications over a communication link 125. For example, a carrier of a communication link 125 may include a portion of a radio frequency spectrum band that is operated according to physical layer channels for a given radio access technology. Each physical layer channel may carry user data, control information, or other signaling. A carrier may be associated with a pre-defined frequency channel (e.g., an evolved universal mobile telecommunication system terrestrial radio access (E-UTRA) absolute radio frequency channel number (EARFCN)), and may be positioned according to a channel raster for discovery by UEs 115. Carriers may be downlink or uplink (e.g., in an FDD mode), or be configured to carry downlink and uplink communications (e.g., in a TDD mode). In some examples, signal waveforms transmitted over a carrier may be made up of multiple sub-carriers (e.g., using multi-carrier modulation (MCM) techniques such as orthogonal frequency division multiplexing (OFDM) or discrete Fourier transform spread OFDM (DFT-S-OFDM)).

The organizational structure of the carriers may be different for different radio access technologies (e.g., LTE, LTE-A, LTE-A Pro, NR). For example, communications over a carrier may be organized according to TTIs or slots, each of which may include user data as well as control information or signaling to support decoding the user data. A carrier may also include dedicated acquisition signaling (e.g., synchronization signals or system information, etc.) and control signaling that coordinates operation for the carrier. In some examples (e.g., in a carrier aggregation configuration), a carrier may also have acquisition signaling or control signaling that coordinates operations for other carriers.

Physical channels may be multiplexed on a carrier according to various techniques. A physical control channel and a physical data channel may be multiplexed on a downlink carrier, for example, using time division multiplexing (TDM) techniques, frequency division multiplexing (FDM) techniques, or hybrid TDM-FDM techniques. In some examples, control information transmitted in a physical control channel may be distributed between different control regions in a cascaded manner (e.g., between a common control region or common search space and one or more UE-specific control regions or UE-specific search spaces).

A carrier may be associated with a particular bandwidth of the radio frequency spectrum, and in some examples the carrier bandwidth may be referred to as a "system bandwidth" of the carrier or the wireless communications system 100. For example, the carrier bandwidth may be one of a number of predetermined bandwidths for carriers of a particular radio access technology (e.g., 1.4, 3, 5, 10, 15, 20, 40, or 80 MHz). In some examples, each served UE 115 may be configured for operating over portions or all of the carrier bandwidth. In other examples, some UEs 115 may be configured for operation using a narrowband protocol type that is associated with a predefined portion or range (e.g., set of subcarriers or RBs) within a carrier (e.g., "in-band" deployment of a narrowband protocol type).

In a system employing MCM techniques, a resource element may consist of one symbol period (e.g., a duration of one modulation symbol) and one subcarrier, where the symbol period and subcarrier spacing are inversely related. The number of bits carried by each resource element may depend on the modulation scheme (e.g., the order of the modulation scheme). Thus, the more resource elements that a UE 115 receives and the higher the order of the modulation scheme, the higher the data rate may be for the UE 115. In MIMO systems, a wireless communications resource may refer to a combination of a radio frequency spectrum resource, a time resource, and a spatial resource (e.g., spatial layers), and the use of multiple spatial layers may further increase the data rate for communications with a UE 115.

Devices of the wireless communications system 100 (e.g., base stations 105 or UEs 115) may have a hardware configuration that supports communications over a particular carrier bandwidth, or may be configurable to support communications over one of a set of carrier bandwidths. In some examples, the wireless communications system 100 may include base stations 105 and/or UEs 115 that support simultaneous communications via carriers associated with more than one different carrier bandwidth.

Wireless communications system 100 may support communication with a UE 115 on multiple cells or carriers, a feature which may be referred to as carrier aggregation or multi-carrier operation. A UE 115 may be configured with multiple downlink component carriers and one or more uplink component carriers according to a carrier aggregation configuration. Carrier aggregation may be used with both FDD and TDD component carriers.

In some cases, wireless communications system 100 may utilize enhanced component carriers (eCCs). An eCC may be characterized by one or more features including wider carrier or frequency channel bandwidth, shorter symbol duration, shorter TTI duration, or modified control channel configuration. In some cases, an eCC may be associated with a carrier aggregation configuration or a dual connectivity configuration (e.g., when multiple serving cells have a suboptimal or non-ideal backhaul link). An eCC may also be configured for use in unlicensed spectrum or shared spectrum (e.g., where more than one operator is allowed to use the spectrum). An eCC characterized by wide carrier bandwidth may include one or more segments that may be utilized by UEs 115 that are not capable of monitoring the whole carrier bandwidth or are otherwise configured to use a limited carrier bandwidth (e.g., to conserve power).

In some cases, an eCC may utilize a different symbol duration than other component carriers, which may include use of a reduced symbol duration as compared with symbol durations of the other component carriers. A shorter symbol duration may be associated with increased spacing between adjacent subcarriers. A device, such as a UE 115 or base station 105, utilizing eCCs may transmit wideband signals (e.g., according to frequency channel or carrier bandwidths of 20, 40, 60, 80 MHz, etc.) at reduced symbol durations (e.g., 16.67 microseconds). A TTI in eCC may consist of one or multiple symbol periods. In some cases, the TTI duration (that is, the number of symbol periods in a TTI) may be variable.

Wireless communications system 100 may be an NR system that may utilize any combination of licensed, shared, and unlicensed spectrum bands, among others. The flexibility of eCC symbol duration and subcarrier spacing may allow for the use of eCC across multiple spectrums. In some examples, NR shared spectrum may increase spectrum utilization and spectral efficiency, specifically through dynamic vertical (e.g., across the frequency domain) and horizontal (e.g., across the time domain) sharing of resources.

Wireless communications system 100 may support low complexity UEs 140 (e.g., which may be referred to as Light devices, NR-Light devices, low tier devices, IoT devices, etc.). A low complexity UE 140 may also be referred to as a low tier UE for which some features, or premium features, may not be needed or useful. For example, low complexity UEs 140 may include smart devices, sensors (e.g., industrial sensors), cameras (e.g., video monitoring devices), wearable devices, IoT devices, low tier or relaxed devices, etc. Such low complexity UEs 140 may be used in a variety of applications, including healthcare, smart cities, transportation and logistics, electricity distribution, process automation, and building automation. Low complexity UEs 140 may communicate with a base station 105 and operate in the same cell as other, non-low complexity UEs (e.g., which may be referred to as regular UEs 115, premium UEs, etc.). For example, in some cases, a low complexity UE 140 may be connected to a network via a connection to a base station 105, in addition to being connected to other UEs 115 (e.g., to one or more premium UEs) via device-to-device (e.g., sidelink) connections.

As such, in some cases, a low complexity UE 140 may perform random access procedures (e.g., to establish or maintain a connection with a base station 105). The random access procedure may include a series of handshake messages carrying information that facilitates establishing the connection between the low complexity UE 140 and the base station 105. For example, a network may implement periodic and/or aperiodic time/frequency resources that UEs (e.g., UEs 115 and low complexity UEs 140) may use to perform random access procedures. Random access procedures may include CBRA procedures (e.g., where the device contends for the channel for random access procedure signaling) as well as CFRA procedures (e.g., where time/frequency resources are preconfigured for devices to conduct random access procedure signaling).

While low complexity UEs 140 having relatively more limited capabilities may meet the requirements of, and support communications using, for example, narrowband Internet-of-Things (NB-IoT) and Long Term Evolution (LTE) for Machines (LTE-M), such limited capabilities may also pose additional challenges within wireless communications systems. That is, allowing low complexity UEs 140 to maintain their intended benefits (e.g., power savings, low cost/low complexity design, etc.) may result in challenges for certain operations or certain applications.

For example, low complexity UEs 140 may be configured with reduced capabilities that may result in inefficient random access procedures. For instance, a low complexity UE 140 may be configured to transmit with a reduced transmit power compared to other non-low complexity devices (e.g., compared to other premium UEs 115 that may operate in same cell as the low complexity UE 140). For example, the uplink transmit power of a low complexity UE 140 may have a transmission power capability of, for example, 10 dBs less than that of a premium UE 115. As such, low complexity UEs 140 configured with CBRA procedures (e.g., where the low complexity UE 140 contends for the channel amongst other higher powered premium UEs 115) may have difficulty or may be unable to successfully perform such CBRA procedures (e.g., CBRA procedures performed by a low complexity UE 140 may be inefficient and may be associated with network connection latency, poor network connections, etc.).

According to the techniques described herein, low complexity UEs 140 may leverage external assistance from other UEs 115 (e.g., via device-to-device communications) to improve random access procedures. For example, a low complexity UE 140 may be in communication with another UE 115 (e.g., with a premium UE or more capable UE) via a device-to-device communication link (e.g., via sidelink), and the low complexity UE 140 may leverage the device-to-device link to improve (e.g., simplify, expedite, etc.) random access procedures performed by the low complexity UE 115. For instance, according to the techniques described herein, a low complexity UE 140 may request CFRA resources via a device-to-device link with another UE 115. In some cases, the request may include a reason for the request (e.g., a condition of the low complexity UE 140), preferred CFRA resources, etc. The assisting UE 115 (e.g., another UE 115 in device-to-device communication with the low complexity UE 140) may receive the request from the low complexity UE 140 and forward the request to the network (e.g., to a base station 105). The network (e.g., wireless communications system 100) may then configure CFRA resources for the low complexity UE 140, and may transmit the CFRA configuration directly to the low complexity UE 140, may transmit the CFRA configuration to the low complexity UE 140 through another UE 115 (e.g., through some other UE 115 for forwarding to the low complexity UE 140), etc. Upon receiving the CFRA configuration, the low complexity UE 140 may perform a random access procedure (e.g., a CFRA procedure) with the network (e.g., with the base station 105) accordingly.

The described techniques may provide for improved random access configuration and more efficient random access procedures that may allow low complexity UEs 140 to maintain their intended benefits (e.g., power savings, low transmit power, efficiencies in device-to-device communications, etc.). For example, low complexity UEs 140 may request CFRA resources (e.g., via a device-to-device link with a premium UE 115) and receive a CFRA configuration to increase the likelihood of successful random access procedures with a base station 105 (e.g., which may result in more efficient random access procedures, which may further result in reduced latency and improved network connections relative to other CBRA procedures performed by low complexity UEs 140). Further, low complexity UE 140 leveraging of external assistance from other UEs 115 (e.g., from a connected premium UE) may result in improved likelihood of successful communication of such requests for CFRA resources to a base station 105 (e.g., as a connected premium UE 115 may more efficiently request CFRA resources on behalf of the low complexity UE 140 that may be associated with reduced transmit power capabilities).

Figure 2:
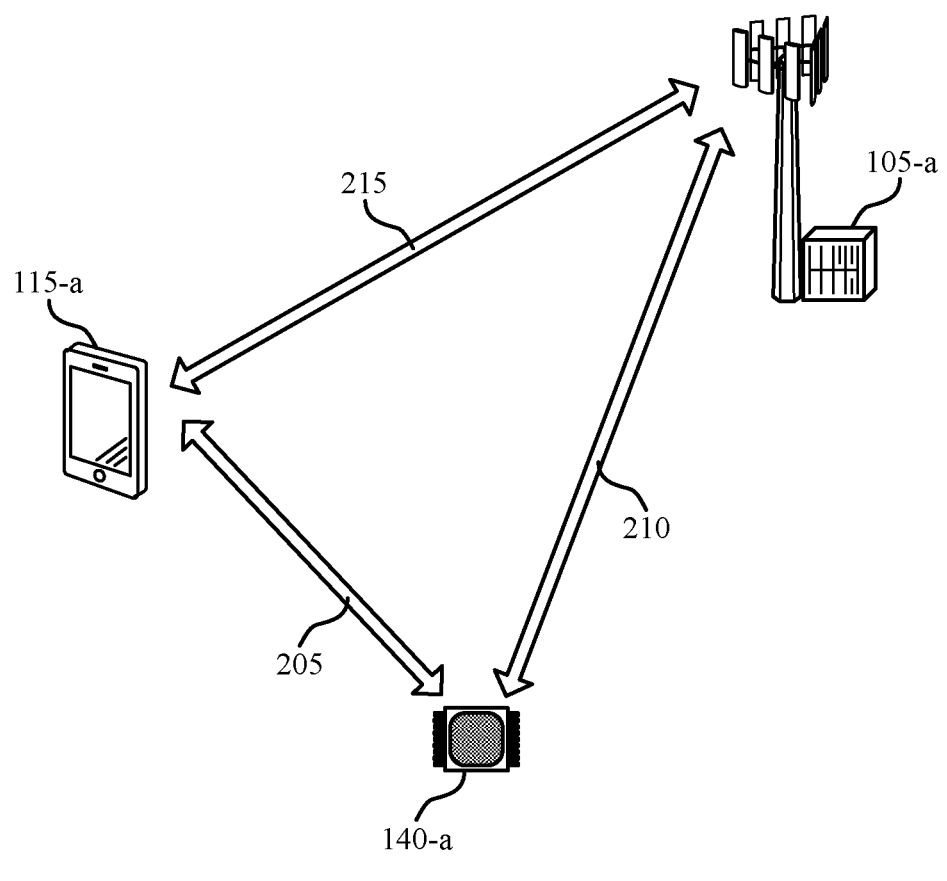
FIG. 2 illustrates an example of a communications system that supports random access channel procedures with external assistance in accordance with aspects of the present disclosure.

FIG. 2 illustrates an example of a wireless communications system 200 that supports random access channel procedures with external assistance in accordance with aspects of the present disclosure. In some examples, wireless communications system 200 may implement aspects of wireless communications system 100. For example, wireless communications system 200 may include a base station 105-a, a UE 115-a, and a low complexity UE 140-a (e.g., a smart watch), which may be examples of the corresponding devices described with reference to FIG. 1. Further, as described herein, low complexity UE 140-a may generally include or refer to a Light device, a NR-Light device, a low tier device, an IoT device, a smart device, a sensor, a camera, a wearable device, etc.

Low complexity UEs 140 may be designed for low cost, low power consumption, etc. For example, low complexity UE 140s may be designed for wireless sensor applications such as pressure sensors, humidity sensors, thermometers, motion sensors, accelerometers, etc. In some cases, low complexity UEs 140 may be designed for wearable device applications such as smart watches, rings, eHealth related devices, medical monitoring devices, fitness or biological monitoring devices, etc. As such, low complexity UEs 140 may be smaller in size and have lower battery capacity compared to regular UEs 115 (e.g., compared to mobile phones, tablet devices, etc.). As such, a low complexity UE 140 may be designed to reduce device complexity and operation procedures of the low complexity UE 140. According to the techniques described herein, a low complexity UE 140 may leverage (e.g., use) external assistance from other UEs 115 based on device-to-device communication in order to simplify random access procedures of low complexity UEs 140.

For example, low complexity UE 140-a may be capable of device-to-device communication and may thus maintain links to other UEs 115 as well as links to base stations 105. In the example of FIG. 2, UE 140-a may maintain a link 205 (e.g., which may be referred to as a device-to-device link, a sidelink, a PC5 link, etc.) to UE 115-a as well as a link 210 (e.g., which may be referred to as a link to the cellular air interface, a Uu interface, etc.) to base station 105-a. In some cases, low complexity UE 140-a may use link 205 to extend its communication coverage, increase channel throughput to the cellular network, etc. (e.g., via communications through link 215 that may be forwarded by UE 115-a through link 205, via communications through link 205 that may be forwarded by UE 115-a through link 215, etc.). For example, UE 115-a may be connected to the base station 105-a via link 215 (e.g., which may be referred to as a link to the cellular air interface, a Uu interface, etc.), and may provide forwarding operations for communications between low complexity UE 140-a and base station 105-a. Low complexity UE 140-a may maintain both link 210 and link 205 because the coverage of the cellular network (e.g., the coverage via link 210) may be broader thank the coverage via link 205. Further, low complexity UE 140-a may maintain both link 210 and link 205 because communications via link 205 may be associated with lower power consumption by the low complexity UE 140-a.

As discussed herein, random access may be used by low complexity UE 140-a to, for example, achieve uplink synchronization with base station 105-a (e.g., such that low complexity UE 140-a may send information to base station 105-a). In some cases, random access procedures (e.g., random access channel (RACH) procedures) may be performed for initial access from idle mode, for RRC Connection Re-establishment procedures, for downlink or uplink data arrival during connected mode when uplink synchronization is lost, for uplink data arrival during connected mode when no physical uplink control channel (PUCCH) resource for a scheduling request (SR) is available, for SR failure, for request by RRC upon synchronous reconfiguration for handover, for transition from UE inactive mode, to establish time alignment for a secondary timing advance group (TAG), to request for other system information (Other SI), for beam failure recovery, etc. In some cases, random access may be contention based (e.g., such as for CBRA procedures), where multiple UEs (e.g., multiple UEs 115 and/or low complexity UEs 140) may perform random access together which may cause collisions. In some cases, random access may be contention free (e.g., such as for CFRA procedures), where UE dedicated RACH resource and preamble may be allocated (e.g., which may reduce or eliminated collision).

The techniques described herein may provide for low complexity UE 140 requesting of CFRA resource and preamble for random access. Generally, CFRA resources may refer to resources reserved for a random access procedure performed by some device (e.g., such as by low complexity UE 140). That is, CFRA resources (and CFRA configuration) may refer to resources reserved or configured for a random access procedure in the context of a system that also supports contention based access of other resources (e.g., CFRA resources may not necessarily imply the resources are entirely free of contention from other wireless devices, however the CFRA resources may be reserved and configured within the system to reduce or eliminate contention from other wireless devices within the system).

Low complexity UE 140 requests for CFRA resources (e.g., and resulting base station 105-a configuration of CFRA resources for low complexity UE 140) may provide for faster random access by low complexity UE 140, may improve random access success rate when low complexity UE 140 has a reduced maximum uplink transmit power, etc.

In wireless communications system 200, if low complexity UE 140-a determines to perform a random access to the network (e.g., to base station 105-a), CBRA is configured for the low complexity UE 140-a, and if low complexity UE 140-a can communicate with UE 115-a via link 205, then low complexity UE 140-a may request CFRA resources and preambles (e.g., via transmitting a request to UE 115-a using link 205). The UE 115-a may transmit or forward the request to the network (e.g., to base station 105-a), and the network may configure low complexity UE 140-a with a CFRA configuration based on the request. As such, upon receiving the CFRA configuration, low complexity UE 140-a may perform a CFRA to the network (e.g., low complexity UE 140-a may perform a CFRA procedure with base station 105-a).

In some cases, low complexity UE 140-a may include the reason for random access in the request for CFRA resources and preambles (e.g., the low complexity UE 140-a may include an indication of the condition of the low complexity UE 140-a that is prompting the request for CFRA resources). For example, in some cases, certain conditions of the low complexity UE 140-a may prompt or trigger the low complexity UE 140-a to request CFRA resources for a random access procedure. Such conditions (e.g., or in other words scenarios) may include initial access from idle mode, RRC Connection re-establishment procedure for radio link failure recovery, downlink or uplink data arrival during connected mode when uplink synchronization is lost if CFRA is not configured, uplink data arrival during connected mode when no PUCCH resource for SR is available, SR failure, request by RRC upon synchronous reconfiguration for handover if CFRA is not configured for handover, transition from UE inactive mode, establishment of time alignment for a secondary TAG, requesting for Other SI, beam failure recovery if CFRA is not configured for beam failure recovery, etc. For example, low complexity UE 140-a may transmit a request for CFRA resources to UE 115-a using link 205, where the request may include an indication of the low complexity UE 140-a attempting to perform initial access from idle mode, an indication of a radio link failure recovery condition of the low complexity UE 140-a, an indication that no PUCCH resource for SR is available for the low complexity UE 140-*a*, and indication the low complexity UE 140-*a* is transitioning from UE inactive mode, an indication CFRA is not configured for beam failure recovery by the low complexity UE 140-*a*, etc. Generally, the request may include information indicating various conditions of the low complexity UE 140-*a* and/or information indicating reasons/scenarios for why the low complexity UE 140-*a* is requesting the CFRA resources).

In some examples, low complexity UE 140-*a* may include preferences (e.g., preferences for random access configuration) in the request. For example, low complexity UE 140-*a* may identify or determine preferred synchronization signal block (SSB) indices, preferred channel state information reference signal (CSI-RS) resource IDs (e.g., if CSI-RS has been configured to the low complexity UE 140-*a* before the random access), etc. associated with a preferred random access resource, a preferred preamble, a preferred random access occasion, etc. For example, different SSBs may be mapped to different sets of resources to be used as TDM'd RACH resources, or different SSBs may be mapped to overlapping sets of time resources for RACH transmissions (e.g., FDM'd RACH resources). Additionally or alternatively, different SSBs may further correspond to different spatial resources, for example, to different directional downlink transmit and uplink receive beams. As such, in some examples, low complexity UE 140-*a* may determine a preferred random access resource, a preferred random access preamble, and/or a preferred random access occasion, and the low complexity UE 140-*a* may include an indication of such in the CFRA request. In some examples, low complexity UE 140-*a* may determine one or more preferred SSB indices and/or one or more CSI-RS resource identifications associated with the preferred random access resource, the preferred random access preamble, or the preferred random access occasion, and the low complexity UE 140-*a* may include an indication of such in the CFRA request. Further, in some examples, the CFRA request may indicate the requested random access resource is for 4-step RACH, 2-step RACH, or both).

In some cases, the low complexity UE 140-*a* may include it unique identity (e.g. UE_ID) in the CFRA request, and the unique identity of the low complexity UE 140-*a* may be used to identify the low complexity UE 140-*a* in over the air signaling from the base station 105-*a* to the UE 115-*a* (e.g., the unique identity of the low complexity UE 140-*a* may be used by UE 115-*a* or other UEs 115 for forwarding of CFRA configurations from base station 105-*a* to low complexity UE 140-*a*). In some cases, the identity or identifier low complexity UE 140-*a* may be a cell radio network temporary identifier (C-RNTI) of the low complexity UE 140-*a* (e.g., if the low complexity UE 140-*a* has obtained a C-RNTI in the cell before the low complexity UE 140-*a* performs the random access.

The network (e.g., base station 105-*a*) may configure CFRA resources and preambles to low complexity UE 140-*a*. The CFRA configuration may include (e.g., but may not necessarily be limited to) random access time/frequency resource information, preamble information (e.g., CFRA preamble information), random access occasion information, associated SSB time index information, CSI-RS resource ID information (e.g., if CSI-RS has been configured to the low complexity UE 140-*a* before the random access), etc. For example, in some cases, the CFRA configuration may be determined and configured by the network based at least in part on (e.g., considering/adhering to some, all, or none of) preferences included in the request (e.g., based at least in part on preferred CFRA resources, preferred SSB indices, etc. indicated by low complexity UE 140-*a* in the CFRA request). In some cases, the CFRA configuration may be based on an indicated preference (e.g., included in the CFRA request) for 4-step RACH, 2-step RACH, or both (e.g., and the CFRA configuration may indicate whether the random access resource is associated with a 4-step RACH or 2-step RACH or both).

In some examples, the CFRA configuration may be based on a condition included in the CFRA request. For example, in some cases, the network (e.g., base station 105-*a*) may configure CFRA resources for some conditions of the low complexity UE 140, and may not configure CFRA resources for other conditions of the low complexity UE 140 (e.g., based on various considerations by the network such as the importance or critical nature of the condition indicated by the CFRA request, such as applications of the low complexity UE 140 and applications of other UEs 115, such as priority of the low complexity UE 140 and priorities of other UEs 115, such as network congestion, such as availability of CFRA resources, etc.).

As discussed herein, low complexity UE 140-*a* may generally transmit a request for CFRA resources via leveraging external assistance (e.g., via transmitting the request using a device-to-device link, such as link 205). Such signaling of requests for CFRA resources by low complexity UEs 140 is further described herein, for example, with reference to FIG. 3A. Based on the request for CFRA resources, the network may determine a CFRA resource configuration for the low complexity UE 140-*a*, and the network (e.g., base station 105) may transmit the CFRA configuration as further described herein, for example, with reference to FIG. 3B. Upon reception of the configured random access resources and associated information (e.g., upon reception of the CFRA configuration), low complexity UE 140-*a* may perform CFRA to the wireless network. For example, base station 105-*a* may detect a RACH preamble associated with the CFRA configuration at the random access occasions associated with the CFRA configuration.

FIGS. 3A and 3B illustrates example communication diagrams 300-303 that support random access channel procedures with external assistance in accordance with aspects of the present disclosure. In some examples, communication diagrams 300-303 may implement aspects of wireless communications system 100 and/or wireless communications system 200. For example, communication diagrams 300-303 may include a base station 105-*b*, a UE 115-*b*, a UE 115-*c*, and a low complexity UE 140-*b* (e.g., a smart watch), which may be examples of the corresponding devices described with reference to FIGS. 1 and 2. Further, as described herein, low complexity UE 140-*b* may generally include or refer to a Light device, a NR-Light device, a low tier device, an IoT device, a smart device, a sensor, a camera, a wearable device, etc.

FIG. 3A illustrates example communication diagram 300 that may illustrate signaling of requests for CFRA resources by low complexity UEs 140. For example, low complexity UE 140-*b* may transmit a request to UE 115-*b*. In some cases, the request may be referred to herein as a request for random access resources, a request for CFRA resources, a random access assistance request, an external assistance request, etc. The UE 115-*b* (e.g., a connected UE 115, a premium UE 115, etc.) may then transmit or forward the request to base station 105-*b*. As such, base station 105-*b* may receive the request and may configure random access resources (e.g., CFRA resources) for the low complexity UE 140-*b*. As discussed herein, such external assistance from UE 115-*b* (e.g., via a device-to-device link between the UE 115-*b* and the low complexity UE 140-*b*) may provide for more efficient requesting of random access resources by low complexity UE 140-*b* (e.g., as low complexity UE 140-*b* may transmit more efficiently, at low power, etc. over the device-to-device link, and the UE 115-*b* may then forward the request at a higher transmit power to the base station 105-*b* which may increase the likelihood of successful reception by base station 105-*b*).

FIG. 3B illustrates example communication diagrams 301-303 that may each illustrate example network (e.g., base station 105-*b*) configuration of random access resources for low complexity UE 140-*b*. In example communication diagram 301, a random access resource configuration (e.g., CFRA configuration, CFRA resource configuration, etc.) may be transmitted by base station 105-*b* through UE 115-*b*. The UE 115-*b* may then transmit the ransom access configuration to the low complexity UE 140-*b* through a device-to-device link. In the example of communication diagram 301, the random access resource configuration may be transmitted from the base station 105-*b* to the low complexity UE 140-*b* through the UE 115-*b* that forwarded the random access resource request on behalf of the low complexity UE 140-*b*. That is, in some cases, communication diagram 300 may illustrate aspects of low complexity UE 140-*b* requesting of random access resources and communication diagram 301 may illustrate aspects of base station 105-*b* random access resource configuration for low complexity UE 140-*b* (e.g., aspects of communication diagram 300 and communication diagram 301 may be combined in implementation).

In example communication diagram 302, a random access resource configuration (e.g., CFRA configuration, CFRA resource configuration, etc.) may be transmitted by base station 105-*b* through UE 115-*b* and/or UE 115-*c*. The UE 115-*b* and/or UE 115-*c* may then transmit the ransom access configuration to the low complexity UE 140-*b* through respective device-to-device links with the low complexity UE 140-*b*. In the example of communication diagram 302, the random access resource configuration may be transmitted from the base station 105-*b* to the low complexity UE 140-*b* through the UE 115-*b* that forwarded the random access resource request on behalf of the low complexity UE 140-*b*, and/or the random access resource configuration may be transmitted from the base station 105-*b* to the low complexity UE 140-*b* through the UE 115-*c* that may be a different UE 115 that the low complexity UE 140-*b* may leverage. That is, in some cases, communication diagram 300 may illustrate aspects of low complexity UE 140-*b* requesting of random access resources and communication diagram 302 may illustrate aspects of base station 105-*b* random access resource configuration for low complexity UE 140-*b* (e.g., aspects of communication diagram 300 and communication diagram 302 may be combined in implementation).

In example communication diagram 303, a random access resource configuration (e.g., CFRA configuration, CFRA resource configuration, etc.) may be transmitted by base station 105-*b* directly to the low complexity UE 140-*b* (e.g., through a direct link, Uu interface, cellular air interface, etc.). In some cases, communication diagram 300 may illustrate aspects of low complexity UE 140-*b* requesting of random access resources and communication diagram 303 may illustrate aspects of base station 105-*b* random access resource configuration for low complexity UE 140-*b* (e.g., aspects of communication diagram 300 and communication diagram 303 may be combined in implementation).

As discussed herein, in some cases the request for random access resources may include an identifier of the low complexity UE 140-*b*. As such, in example communication diagrams 301-303, UE 115-*b*, UE 115-*c*, and/or low complexity UE 140-*b* may identify that the random access configuration is intended for the low complexity UE 140-*b*. In example communication diagrams 301-302, UE 115-*b* and/or UE 115-*c* may, in some cases, forward the random access configuration to the low complexity UE 140-*b* (e.g., using respective device-to-device links with the low complexity UE 140-*b*) based at least in part on identifying the identifier of the low complexity UE 140-*b* included in the request.

Figure 4:
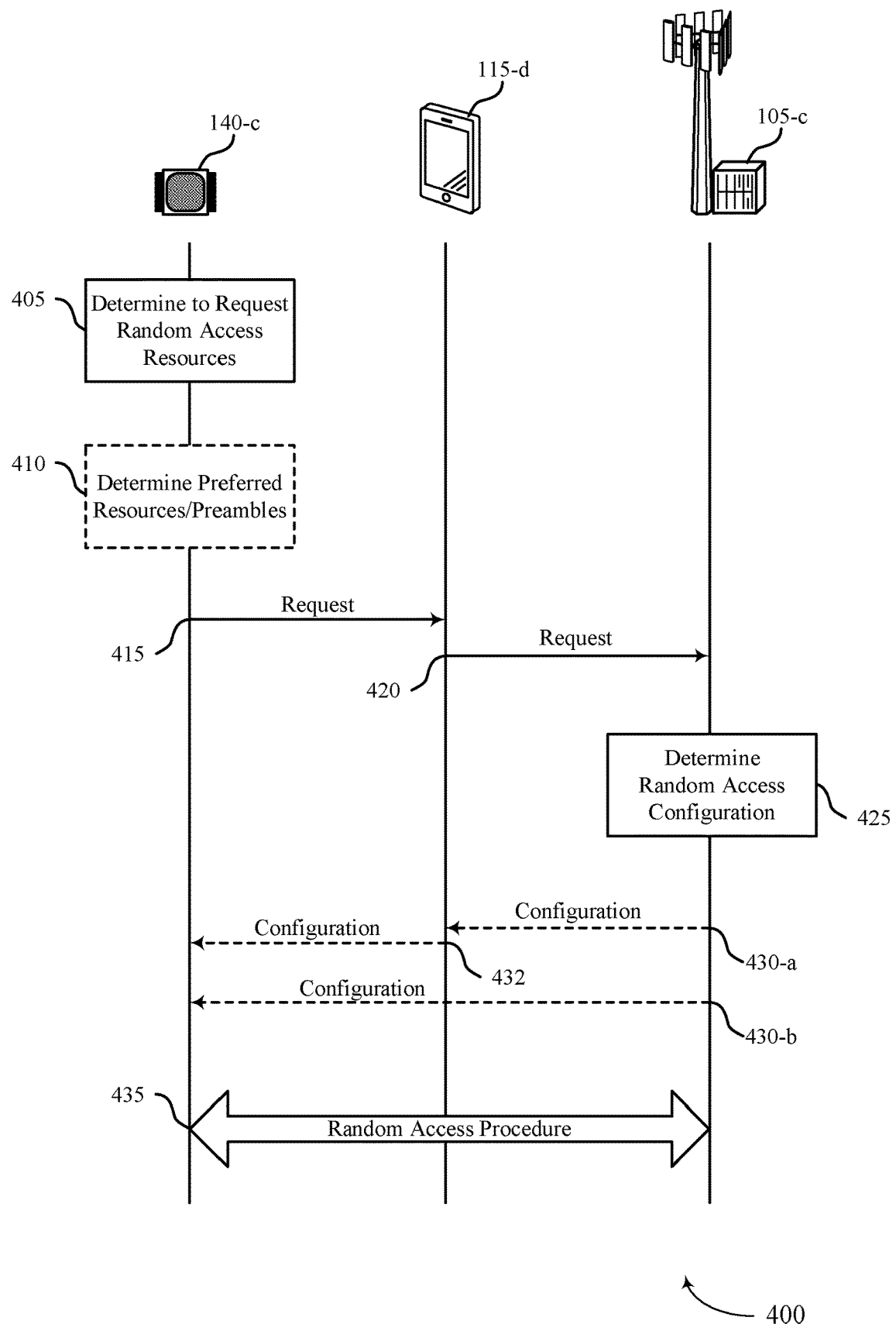
FIG. 4 illustrates an example of a process flow that supports random access channel procedures with external assistance in accordance with aspects of the present disclosure.

FIG. 4 illustrates an example of a process flow 400 that supports random access channel procedures with external assistance in accordance with aspects of the present disclosure. In some examples, process flow 400 may implement aspects of wireless communications system 100 and/or wireless communications system 200. For example, process flow 400 may include a base station 105-*c*, a UE 115-*d*, and a low complexity UE 140-*c* (e.g., a smart watch), which may be examples of the corresponding devices described with reference to FIGS. 1-3. Further, as described herein, low complexity UE 140-*c* may generally include or refer to a Light device, a NR-Light device, a low tier device, an IoT device, a smart device, a sensor, a camera, a wearable device, etc. The process flow 400 includes functions and communications implemented by base station 105-*c*, UE 115-*d*, and low complexity UE 140-*c* in the context of random access channel procedures with external assistance (e.g., for more efficient random access configuration and more efficient random access procedures by a low complexity UE).

In the following description of the process flow 400, the operations between by base station 105-*c*, UE 115-*d*, and low complexity UE 140-*c* may be transmitted in a different order than the order shown, or the operations may be performed in different orders or at different times. Certain operations may also be left out of the process flow 400, or other operations may be added to the process flow 400. It is to be understood that while by base station 105-*c*, UE 115-*d*, and low complexity UE 140-*c* are shown performing a number of the operations of process flow 400, any wireless device may perform the operations shown.

At 405, low complexity UE 140-*c* may determine to request CFRA resources. For example, low complexity UE 140-*c* may determine to request CFRA resources based on a CBRA configuration of the low complexity UE 140-*c*, the low power capability of the low complexity UE 140-*c*, a capability of the low complexity UE 140-*c* to communicate with the UE 115-*d* over a device-to-device link, etc.

In some examples, low complexity UE 140-*c* may determine to request CFRA resources based on a condition of the low complexity UE 140-*c*. For example, the condition (e.g., which may prompt or trigger a CFRA resource request) may include an initial access from idle mode condition, a RRC re-establishment procedure for radio link failure recovery, a downlink data arrival during connected mode when uplink synchronization is lost when CFRA is not configured, an uplink data arrival during connected mode when uplink synchronization is lost when CFRA is not configured, uplink data arrival during connected mode when a physical uplink control channel resource for a scheduling request is unavailable, a scheduling request failure, a request by radio resource control upon synchronous reconfiguration for handover when CFRA is not configured for handover, a transition from a low complexity UE 140-*c* inactive mode, an establishment of time alignment for a secondary timing advance group, a request for other system information, a beam failure recovery when CFRA are not configured for beam failure recovery, etc.

At 410, low complexity UE 140-c may, in some cases, determine or identify some preferences for the random access procedure (e.g., for the request for random access resource configuration). For example, such preferences may include preferred random access preambles, preferred random access resources, preferred SSBs, preferred CSI-RS resources, a preferred 2-step RACH procedure, a preferred 4-step RACH procedure, etc.

At 415, low complexity UE 140-c may transmit a request for CFRA resources to a UE 115-d (e.g., based on a low power capability of the low complexity UE 140-c). As discussed herein, in some cases the request may include the reason for the request (e.g., the condition of the low complexity UE 140-c prompting the request), any preferences for the random access procedure, or both. For example, in some cases, the request may include an indication of the CBRA configuration of the low complexity UE 140-c, the low power capability of the low complexity UE 140-c, the capability of the low complexity UE 140-c to communicate with the UE 115-d over a device-to-device link, or some combination thereof. Additionally or alternatively, the request may include an indication of the preferred random access resource, the preferred random access preamble, the preferred random access occasion, one or more preferred SSB indices, the one or more CSI-RS resource identifications, or some combination thereof.

At 420, UE 115-d may transmit (e.g., forward) the request to base station 105-c (e.g., as further described herein, for example, with reference to communication diagram 300).

At 425, base station 105-c may determine a random access configuration for low complexity UE 140-c. For example, based on the request, base station 105-c may determine a CFRA resource configuration for the low complexity UE 140-c. In some cases, the random access configuration may be based at least in part on the reason or low complexity UE 140-c condition that may be indicated by the request. In some cases, the random access configuration may be based at least in part on preferences for the random access procedure that may be indicated by the request.

At 430, base station 105-c may transmit the random access configuration (e.g., the CFRA resource configuration). In some examples (e.g., at 430-a) base station 105-c may transmit the random access configuration to UE 115-d. In such examples, the UE 115-d may forward the random access configuration to low complexity UE 140-c at 432 (e.g., as further described herein, for example, with reference to communication diagram 301). In other examples (e.g., at 430-b), base station 105-d may directly transmit the random access configuration to low complexity UE 140-c (e.g., as further described herein, for example, with reference to communication diagram 303). In yet other examples, base station 105-b may transmit the random access configuration through some other UE 115 that is connected to the low complexity UE 140-c via a device-to-device link (e.g., as further described herein, for example, with reference to communication diagram 302).

At 435, low complexity UE 140-c may perform a random access procedure with base station 105-c based on the received random access configuration. For example, low complexity UE 140-c may perform CFRA procedure with base station 105-c based on a received CFRA configuration (e.g., base station 105-c may detect a RACH preamble at random access occasions associated with the random access configuration determined at 425 and transmitted at 430).

Figure 5:
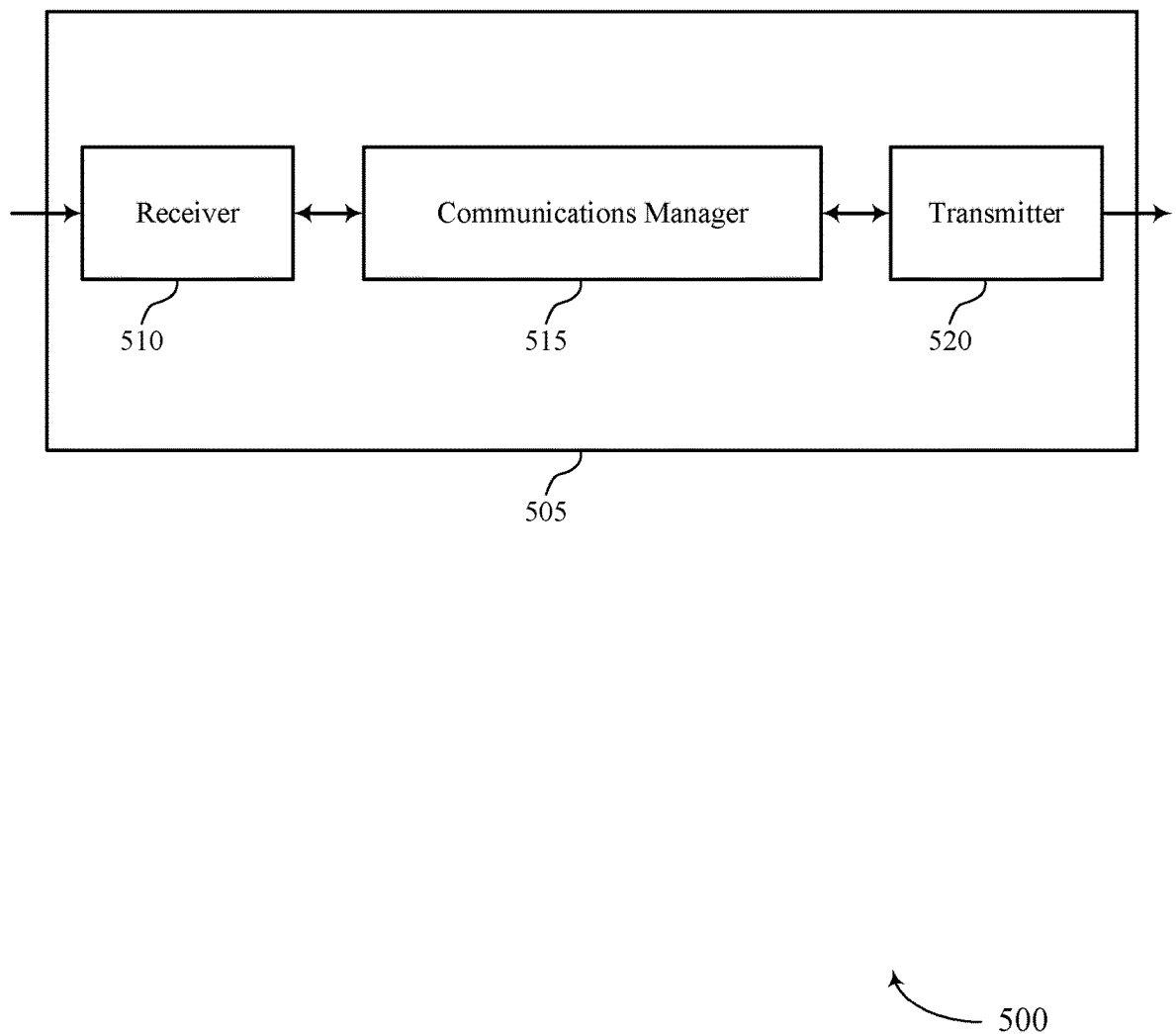
FIGS. 5 and 6 show block diagrams of devices that support random access channel procedures with external assistance in accordance with aspects of the present disclosure.

FIG. 5 shows a block diagram 500 of a device 505 that supports random access channel procedures with external assistance in accordance with aspects of the present disclosure. The device 505 may be an example of aspects of a UE 115 as described herein. The device 505 may include a receiver 510, a communications manager 515, and a transmitter 520. The device 505 may also include a processor. Each of these components may be in communication with one another (e.g., via one or more buses).

The receiver 510 may receive information such as packets, user data, or control information associated with various information channels (e.g., control channels, data channels, and information related to random access channel procedures with external assistance, etc.). Information may be passed on to other components of the device 505. The receiver 510 may be an example of aspects of the transceiver 820 described with reference to FIG. 8. The receiver 510 may utilize a single antenna or a set of antennas.

The communications manager 515 may receive, from a first UE (e.g., from a low complexity UE 140) over a device-to-device link, a request for contention free random access resources based on a low power capability of the first UE, and the communications manager 515 may transmit the request to a base station based on the received request. The communications manager 515 may be an example of aspects of the communications manager 810 described herein.

The communications manager 515, or its sub-components, may be implemented in hardware, code (e.g., software or firmware) executed by a processor, or any combination thereof. If implemented in code executed by a processor, the functions of the communications manager 515, or its sub-components may be executed by a general-purpose processor, a DSP, an application-specific integrated circuit (ASIC), a FPGA or other programmable logic device, discrete gate or transistor logic, discrete hardware components, or any combination thereof designed to perform the functions described in the present disclosure.

The communications manager 515, or its sub-components, may be physically located at various positions, including being distributed such that portions of functions are implemented at different physical locations by one or more physical components. In some examples, the communications manager 515, or its sub-components, may be a separate and distinct component in accordance with various aspects of the present disclosure. In some examples, the communications manager 515, or its sub-components, may be combined with one or more other hardware components, including but not limited to an input/output (I/O) component, a transceiver, a network server, another computing device, one or more other components described in the present disclosure, or a combination thereof in accordance with various aspects of the present disclosure.

The transmitter 520 may transmit signals generated by other components of the device 505. In some examples, the transmitter 520 may be collocated with a receiver 510 in a transceiver module. For example, the transmitter 520 may be an example of aspects of the transceiver 820 described with reference to FIG. 8. The transmitter 520 may utilize a single antenna or a set of antennas.

Figure 6:
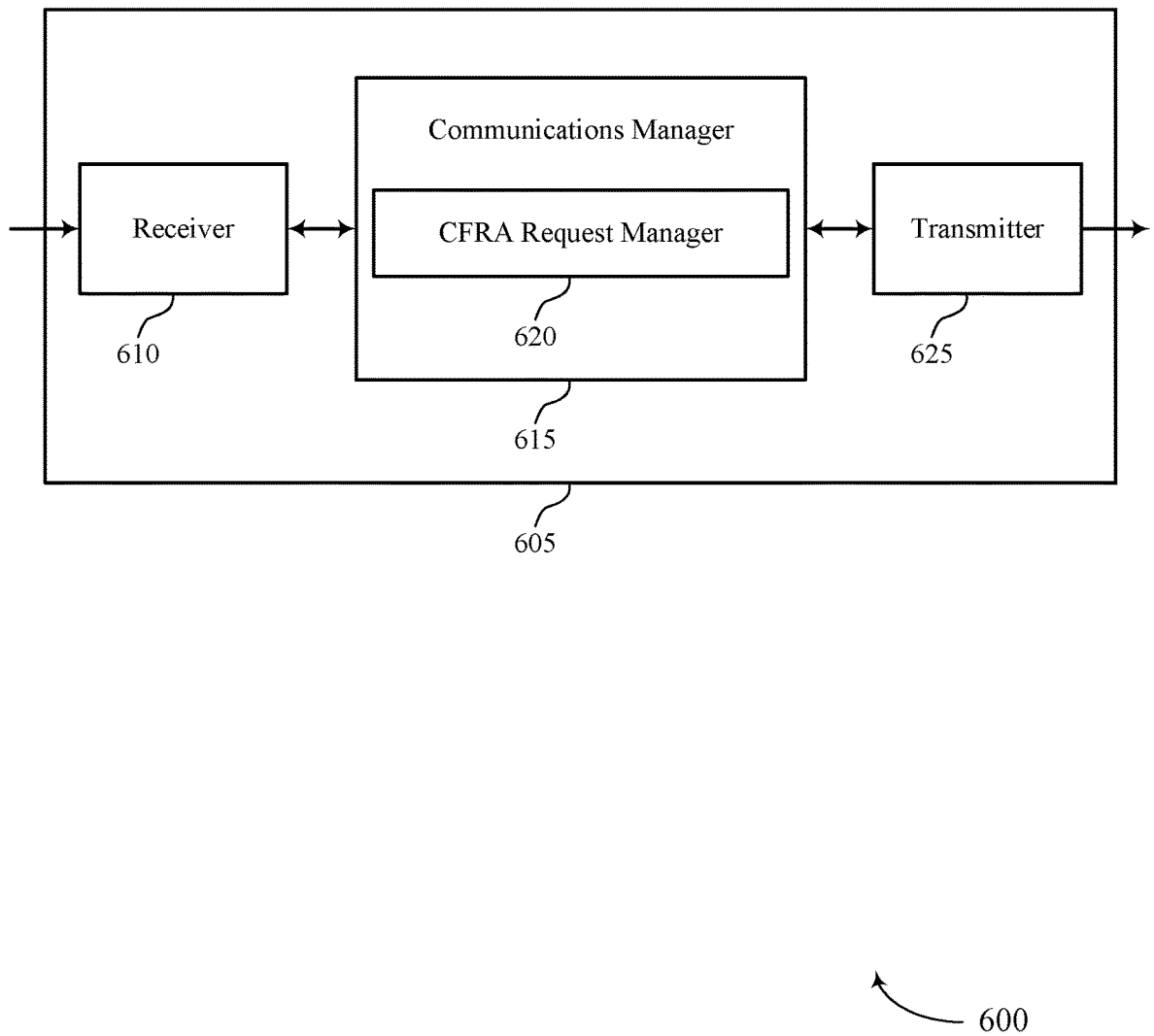

FIG. 6 shows a block diagram 600 of a device 605 that supports random access channel procedures with external assistance in accordance with aspects of the present disclosure. The device 605 may be an example of aspects of a device 505, or a UE 115 as described herein. The device 605 may include a receiver 610, a communications manager 615, and a transmitter 625. The device 605 may also include a processor. Each of these components may be in communication with one another (e.g., via one or more buses).

The receiver 610 may receive information such as packets, user data, or control information associated with various information channels (e.g., control channels, data channels, and information related to random access channel procedures with external assistance, etc.). Information may be passed on to other components of the device 605. The receiver 610 may be an example of aspects of the transceiver 820 described with reference to FIG. 8. The receiver 610 may utilize a single antenna or a set of antennas.

The communications manager 615 may be an example of aspects of the communications manager 515 as described herein. The communications manager 615 may include a CFRA request manager 620. The communications manager 615 may be an example of aspects of the communications manager 810 described herein.

The CFRA request manager 620 may receive, from a first UE (e.g., from a low complexity UE 140) over a device-to-device link, a request for contention free random access resources based on a low power capability of the first UE, and the CFRA request manager 620 may transmit the request to a base station based on the received request.

The transmitter 625 may transmit signals generated by other components of the device 605. In some examples, the transmitter 625 may be collocated with a receiver 610 in a transceiver module. For example, the transmitter 625 may be an example of aspects of the transceiver 820 described with reference to FIG. 8. The transmitter 625 may utilize a single antenna or a set of antennas.

Figure 7:
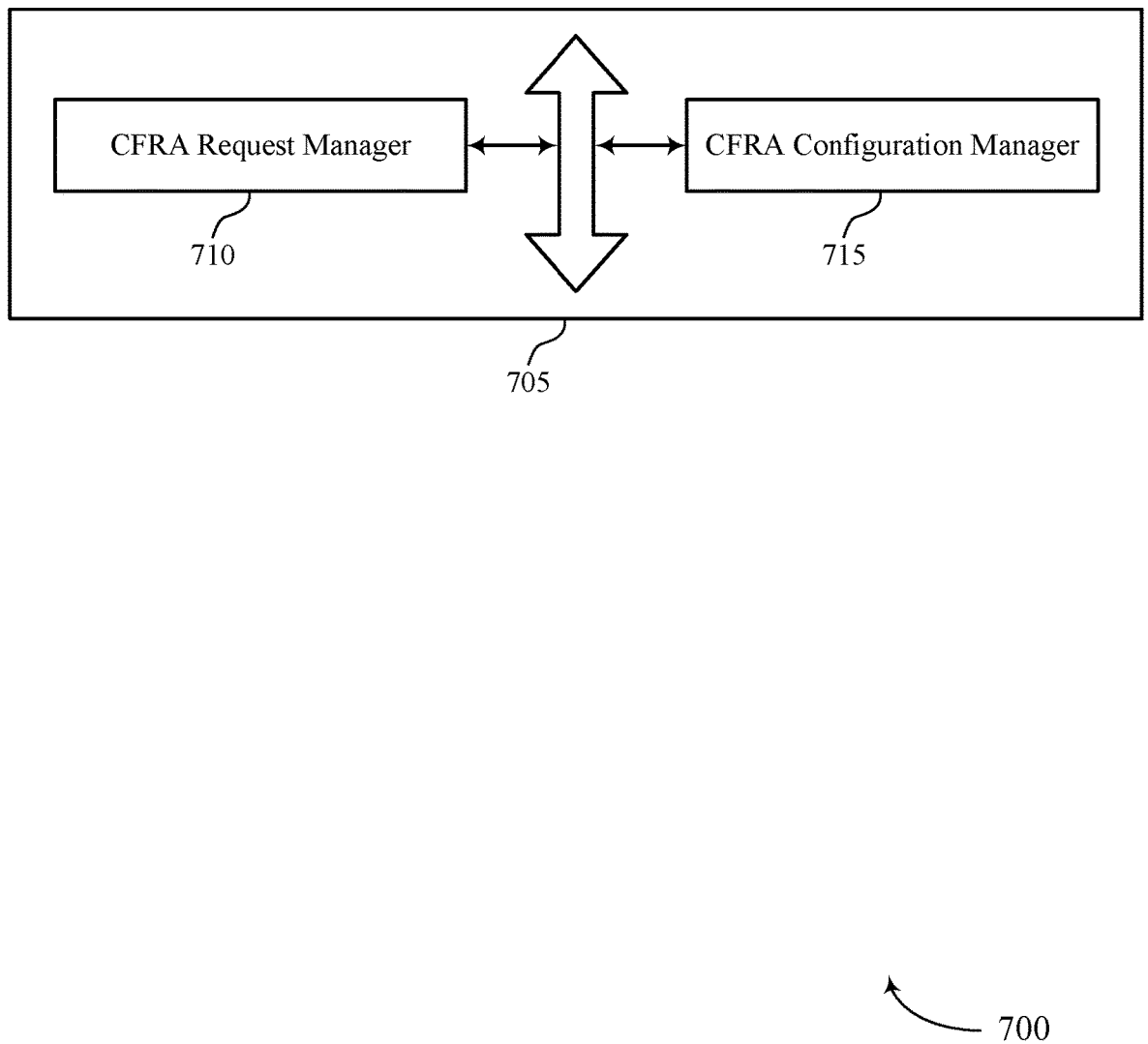
FIG. 7 shows a block diagram of a communications manager that supports random access channel procedures with external assistance in accordance with aspects of the present disclosure.

FIG. 7 shows a block diagram 700 of a communications manager 705 that supports random access channel procedures with external assistance in accordance with aspects of the present disclosure. The communications manager 705 may be an example of aspects of a communications manager 515, a communications manager 615, or a communications manager 810 described herein. The communications manager 705 may include a CFRA request manager 710 and a CFRA configuration manager 715. Each of these modules may communicate, directly or indirectly, with one another (e.g., via one or more buses).

The CFRA request manager 710 may receive, from a first UE (e.g., from a low complexity UE 140) over a device-to-device link, a request for contention free random access resources based on a low power capability of the first UE. In some examples, the CFRA request manager 710 may transmit the request to a base station based on the received request. In some cases, the request includes an identifier of the first UE. In some cases, the identifier of the first UE includes a cell radio network temporary identifier of the first UE.

In some cases, the request includes an indication of a contention based random access configuration of the first UE, the low power capability of the first UE, a capability of the first UE to communicate with the second UE over the device-to-device link, or some combination thereof. In some cases, the request includes an indication of a preferred random access resource for the first UE, a preferred random access preamble for the first UE, a preferred random access occasion for the first UE, or some combination thereof. In some cases, the request includes one or more preferred synchronization signal block indices for the first UE, one or more channel state information reference signal resource identifications for the first UE, or some combination thereof.

In some cases, the request includes an indication of whether the contention free random access resources are for a four-step random access channel procedure, a two-step random access channel procedure, or both. In some cases, the request includes an indication a condition of the first UE. In some cases, the condition includes an initial access from idle mode condition, a radio resource connection re-establishment procedure for radio link failure recovery, a downlink data arrival during connected mode when uplink synchronization is lost when contention free random access is not configured, an uplink data arrival during connected mode when uplink synchronization is lost when contention free random access is not configured, uplink data arrival during connected mode when a physical uplink control channel resource for a scheduling request is unavailable, a scheduling request failure, a request by radio resource control upon synchronous reconfiguration for handover when contention free random access is not configured for handover, a transition from a first UE inactive mode, an establishment of time alignment for a secondary timing advance group, a request for other system information, a beam failure recovery when contention free random access are not configured for beam failure recovery, or some combination thereof.

The CFRA configuration manager 715 may receive a contention free random access configuration from the base station based on the transmitted request. In some examples, the CFRA configuration manager 715 may transmit, to the first UE over the device-to-device link, the contention free random access configuration. In some cases, the contention free random access configuration includes a random access time resource, a random access frequency resource, a random access preamble, a random access occasion, or some combination thereof. In some cases, the contention free random access configuration includes one or more synchronization signal block indices, one or more channel state information reference signal resource identifications, or some combination thereof associated with the random access time resource, the random access frequency resource, the random access preamble, the random access occasion, or some combination thereof. In some cases, the contention free random access configuration includes an indication of whether the contention free random access configuration is for a four-step random access channel procedure, a two-step random access channel procedure, or both.

Figure 8:
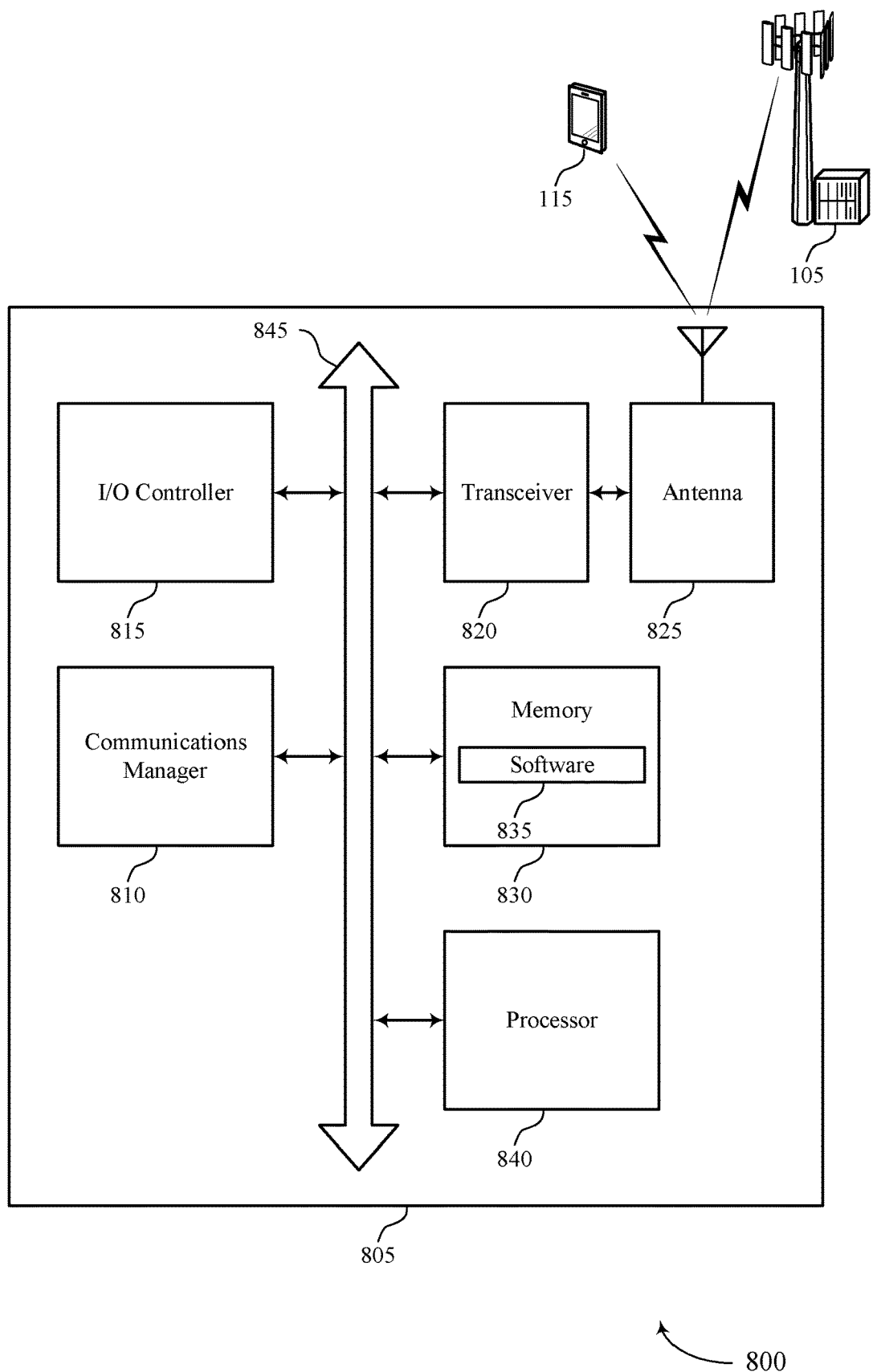
FIG. 8 shows a diagram of a system including a device that supports random access channel procedures with external assistance in accordance with aspects of the present disclosure.

FIG. 8 shows a diagram of a system 800 including a device 805 that supports random access channel procedures with external assistance in accordance with aspects of the present disclosure. The device 805 may be an example of or include the components of device 505, device 605, or a UE 115 as described herein. The device 805 may include components for bi-directional voice and data communications including components for transmitting and receiving communications, including a communications manager 810, an I/O controller 815, a transceiver 820, an antenna 825, memory 830, and a processor 840. These components may be in electronic communication via one or more buses (e.g., bus 845).

The communications manager 810 may receive, from a first UE (e.g., from a low complexity UE 140) over a device-to-device link, a request for contention free random access resources based on a low power capability of the first UE and transmit the request to a base station based on the received request.

The I/O controller 815 may manage input and output signals for the device 805. The I/O controller 815 may also manage peripherals not integrated into the device 805. In some cases, the I/O controller 815 may represent a physical connection or port to an external peripheral. In some cases, the I/O controller 815 may utilize an operating system such as iOS®, ANDROID®, MS-DOS®, MS-WINDOWS®, OS/2®, UNIX®, LINUX®, or another known operating system. In other cases, the I/O controller 815 may represent or interact with a modem, a keyboard, a mouse, a touchscreen, or a similar device. In some cases, the I/O controller 815 may be implemented as part of a processor. In some cases, a user may interact with the device 805 via the I/O controller 815 or via hardware components controlled by the I/O controller 815.

The transceiver 820 may communicate bi-directionally, via one or more antennas, wired, or wireless links as described above. For example, the transceiver 820 may represent a wireless transceiver and may communicate bi-directionally with another wireless transceiver. The transceiver 820 may also include a modem to modulate the packets and provide the modulated packets to the antennas for transmission, and to demodulate packets received from the antennas.

In some cases, the wireless device may include a single antenna 825. However, in some cases the device may have more than one antenna 825, which may be capable of concurrently transmitting or receiving multiple wireless transmissions.

The memory 830 may include RAM and ROM. The memory 830 may store computer-readable, computer-executable code or software 835 including instructions that, when executed, cause the processor to perform various functions described herein. In some cases, the memory 830 may contain, among other things, a BIOS which may control basic hardware or software operation such as the interaction with peripheral components or devices.

The processor 840 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 840 may be configured to operate a memory array using a memory controller. In other cases, a memory controller may be integrated into the processor 840. The processor 840 may be configured to execute computer-readable instructions stored in a memory (e.g., the memory 830) to cause the device 805 to perform various functions (e.g., functions or tasks supporting random access channel procedures with external assistance).

The software 835 may include instructions to implement aspects of the present disclosure, including instructions to support wireless communications. The software 835 may be stored in a non-transitory computer-readable medium such as system memory or other type of memory. In some cases, the software 835 may not be directly executable by the processor 840 but may cause a computer (e.g., when compiled and executed) to perform functions described herein.

Figure 9:
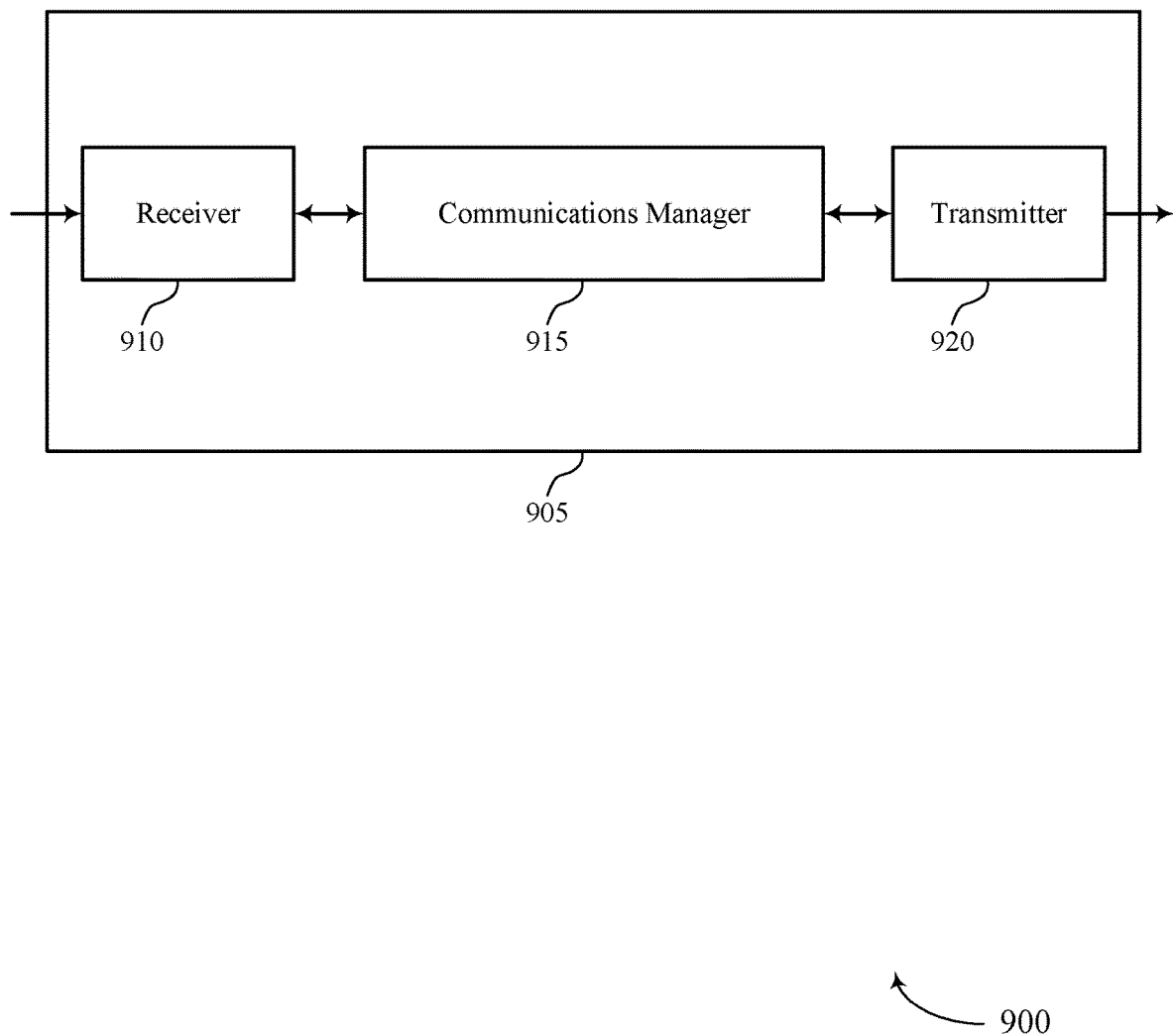
FIGS. 9 and 10 show block diagrams of devices that support random access channel procedures with external assistance in accordance with aspects of the present disclosure.

FIG. 9 shows a block diagram 900 of a device 905 that supports random access channel procedures with external assistance in accordance with aspects of the present disclosure. The device 905 may be an example of aspects of a low complexity UE 140 as described herein. The device 905 may include a receiver 910, a communications manager 915, and a transmitter 920. The device 905 may also include a processor. Each of these components may be in communication with one another (e.g., via one or more buses).

The receiver 910 may receive information such as packets, user data, or control information associated with various information channels (e.g., control channels, data channels, and information related to random access channel procedures with external assistance, etc.). Information may be passed on to other components of the device 905. The receiver 910 may be an example of aspects of the transceiver 1220 described with reference to FIG. 12. The receiver 910 may utilize a single antenna or a set of antennas.

The communications manager 915 may transmit a request for contention free random access resources to a second UE (e.g., a UE 115) based on a low power capability of the first UE (e.g., of the low complexity UE 140), receive a contention free random access configuration based on the request, and perform a contention free random access procedure with a base station based on the received contention free random access configuration. The communications manager 915 may be an example of aspects of the communications manager 1210 described herein.

The communications manager 915, or its sub-components, may be implemented in hardware, code (e.g., software or firmware) executed by a processor, or any combination thereof. If implemented in code executed by a processor, the functions of the communications manager 915, or its sub-components may be executed by a general-purpose processor, a DSP, an application-specific integrated circuit (ASIC), a FPGA or other programmable logic device, discrete gate or transistor logic, discrete hardware components, or any combination thereof designed to perform the functions described in the present disclosure.

The communications manager 915, or its sub-components, may be physically located at various positions, including being distributed such that portions of functions are implemented at different physical locations by one or more physical components. In some examples, the communications manager 915, or its sub-components, may be a separate and distinct component in accordance with various aspects of the present disclosure. In some examples, the communications manager 915, or its sub-components, may be combined with one or more other hardware components, including but not limited to an input/output (I/O) component, a transceiver, a network server, another computing device, one or more other components described in the present disclosure, or a combination thereof in accordance with various aspects of the present disclosure.

The transmitter 920 may transmit signals generated by other components of the device 905. In some examples, the transmitter 920 may be collocated with a receiver 910 in a transceiver module. For example, the transmitter 920 may be an example of aspects of the transceiver 1220 described with reference to FIG. 12. The transmitter 920 may utilize a single antenna or a set of antennas.

Figure 10:
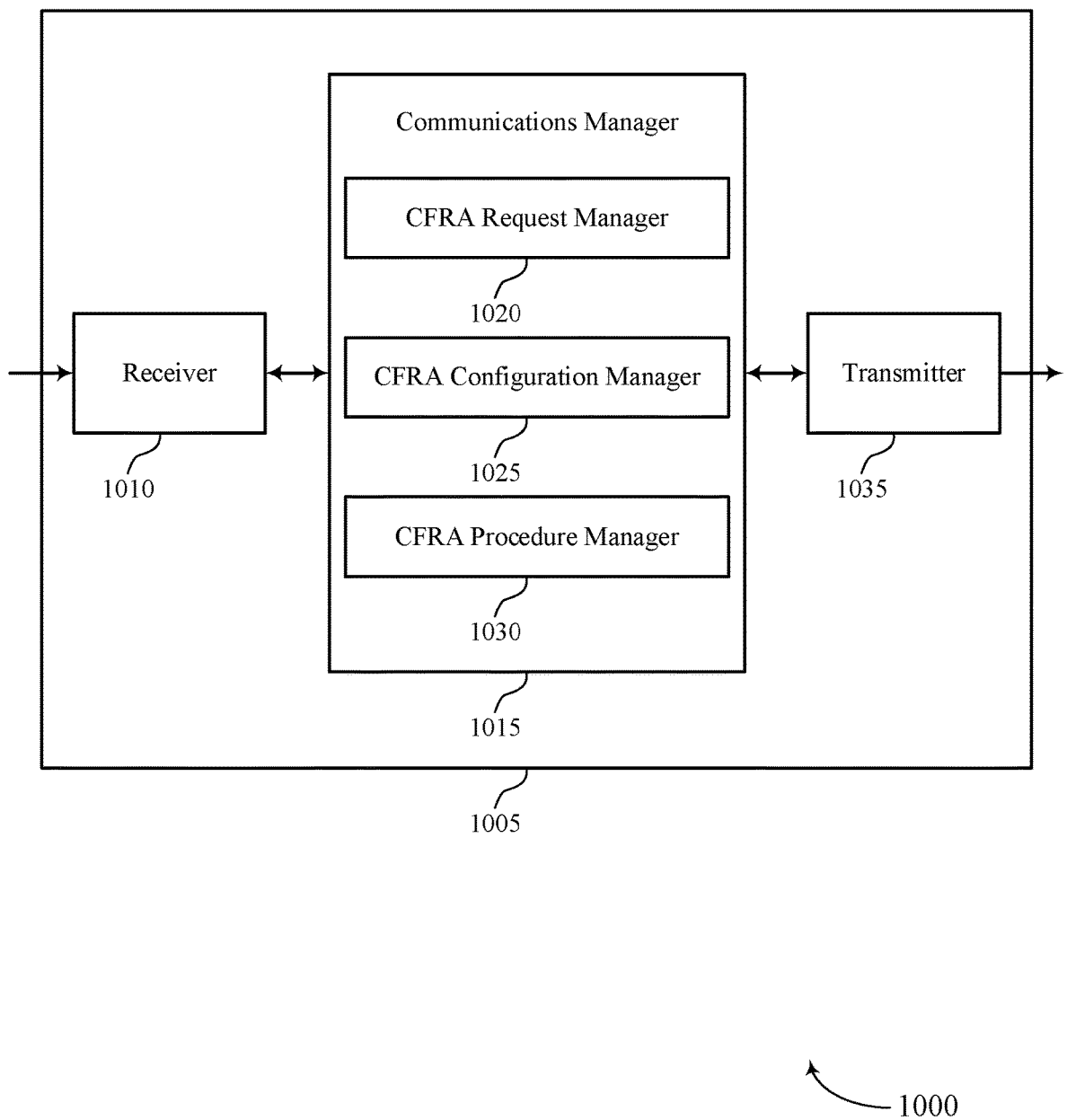

FIG. 10 shows a block diagram 1000 of a device 1005 that supports random access channel procedures with external assistance in accordance with aspects of the present disclosure. The device 1005 may be an example of aspects of a device 905 or a low complexity UE 140 as described herein. The device 1005 may include a receiver 1010, a communications manager 1015, and a transmitter 1035. The device 1005 may also include a processor. Each of these components may be in communication with one another (e.g., via one or more buses).

The receiver 1010 may receive information such as packets, user data, or control information associated with various information channels (e.g., control channels, data channels, and information related to random access channel procedures with external assistance, etc.). Information may be passed on to other components of the device 1005. The receiver 1010 may be an example of aspects of the transceiver 1220 described with reference to FIG. 12. The receiver 1010 may utilize a single antenna or a set of antennas.

The communications manager 1015 may be an example of aspects of the communications manager 915 as described herein. The communications manager 1015 may include a CFRA request manager 1020, a CFRA configuration manager 1025, and a CFRA procedure manager 1030. The communications manager 1015 may be an example of aspects of the communications manager 1210 described herein.

The CFRA request manager 1020 may transmit a request for contention free random access resources to a second UE (e.g., a UE 115) based on a low power capability of the first UE (e.g., of the low complexity UE 140). The CFRA configuration manager 1025 may receive a contention free random access configuration based on the request. The CFRA procedure manager 1030 may perform a contention free random access procedure with a base station based on the received contention free random access configuration.

The transmitter 1035 may transmit signals generated by other components of the device 1005. In some examples, the transmitter 1035 may be collocated with a receiver 1010 in a transceiver module. For example, the transmitter 1035 may be an example of aspects of the transceiver 1220 described with reference to FIG. 12. The transmitter 1035 may utilize a single antenna or a set of antennas.

Figure 11:
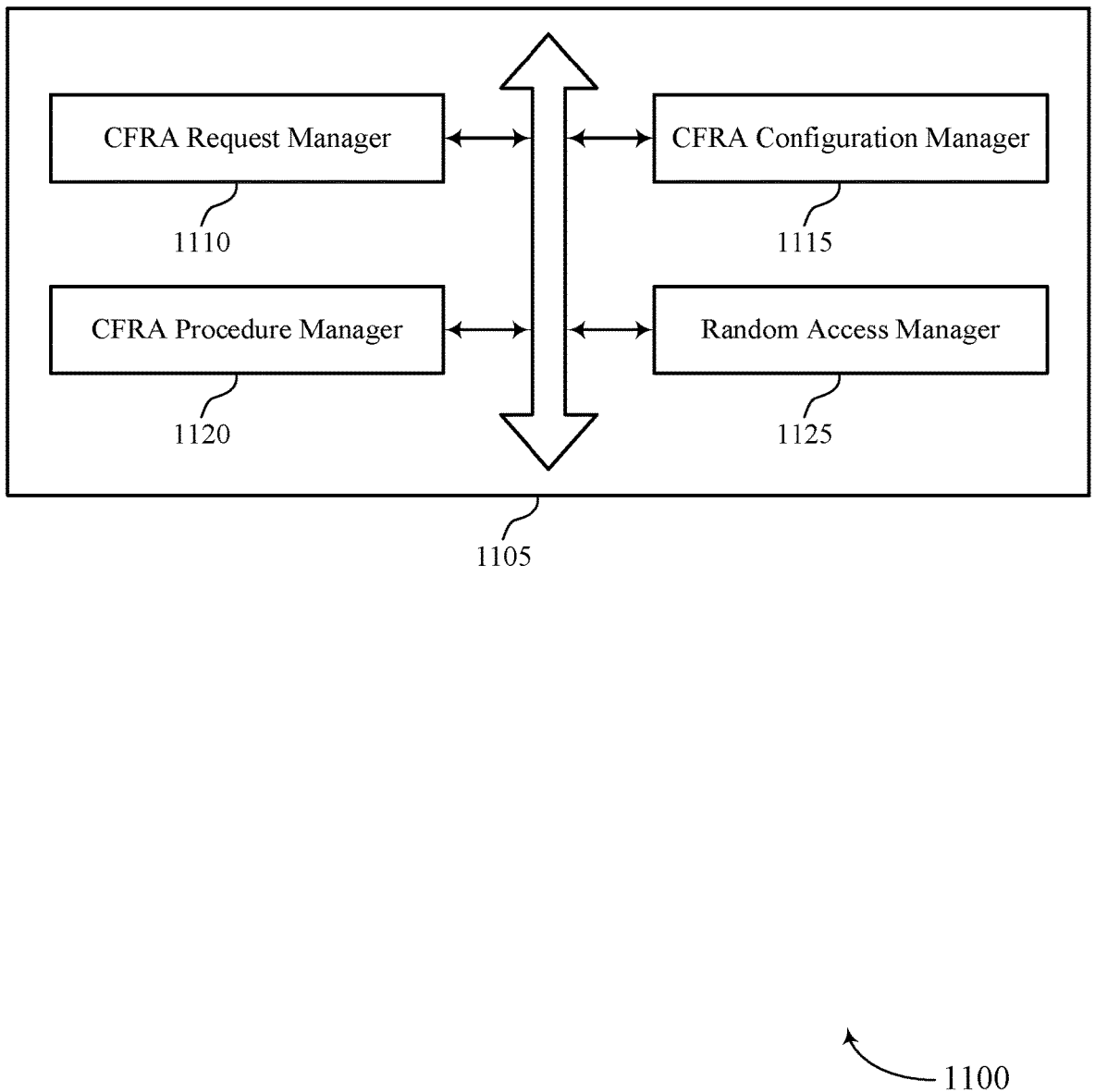
FIG. 11 shows a block diagram of a communications manager that supports random access channel procedures with external assistance in accordance with aspects of the present disclosure.

FIG. 11 shows a block diagram 1100 of a communications manager 1105 that supports random access channel procedures with external assistance in accordance with aspects of the present disclosure. The communications manager 1105 may be an example of aspects of a communications manager 915, a communications manager 1015, or a communications manager 1210 described herein. The communications manager 1105 may include a CFRA request manager 1110, a CFRA configuration manager 1115, a CFRA procedure manager 1120, and a random access manager 1125. Each of these modules may communicate, directly or indirectly, with one another (e.g., via one or more buses).

The CFRA request manager 1110 may transmit a request for contention free random access resources to a second UE (e.g., a UE 115) based on a low power capability of the first UE (e.g., of the low complexity UE 140). In some cases, the request includes an identifier of the first UE and the contention free random access configuration is received by the first UE based on the identifier. In some cases, the identifier includes a cell radio network temporary identifier of the first UE. In some cases, the request is transmitted over a device-to-device link with the second UE.

The CFRA configuration manager 1115 may receive a contention free random access configuration based on the request. In some examples, the CFRA configuration manager 1115 may receive the contention free random access configuration from the second UE. In some examples, the CFRA configuration manager 1115 may receive the contention free random access configuration from the base station. In some examples, the CFRA configuration manager 1115 may receive the contention free random access configuration from a third UE. In some cases, the contention free random access configuration includes a random access time resource, a random access frequency resource, a random access preamble, a random access occasion, or some combination thereof.

In some cases, the contention free random access configuration includes one or more synchronization signal block indices, one or more channel state information reference signal resource identifications, or some combination thereof associated with the random access time resource, the random access frequency resource, the random access preamble, the random access occasion, or some combination thereof. In some cases, the contention free random access configuration includes an indication of whether the contention free random access configuration is for a four-step random access channel procedure, a two-step random access channel procedure, or both.

The CFRA procedure manager 1120 may perform a contention free random access procedure with a base station based on the received contention free random access configuration. In some examples, the CFRA procedure manager 1120 may transmit a random access channel preamble at a random access occasion based on the received contention free random access configuration.

The random access manager 1125 may determine to request the contention free random access resources based on a contention based random access configuration of the first UE, the low power capability of the first UE, a capability of the first UE to communicate with the second UE over a device-to-device link, or some combination thereof, where the request is transmitted based on the determination. In some examples, determining a preferred random access resource, a preferred random access preamble, a preferred random access occasion, or some combination thereof, where the request includes an indication of the preferred random access resource, the preferred random access preamble, the preferred random access occasion, or some combination thereof.

In some examples, determining one or more preferred synchronization signal block indices, one or more channel state information reference signal resource identifications, or some combination thereof associated with the preferred random access resource, the preferred random access preamble, the preferred random access occasion, or some combination thereof, where the request includes the determined one or more preferred synchronization signal block indices, the one or more channel state information reference signal resource identifications, or some combination thereof.

In some examples, the random access manager 1125 may determine whether the contention free random access resources are for a four-step random access channel procedure, a two-step random access channel procedure, or both, where the request includes an indication of the determination. In some examples, the random access manager 1125 may determine to request the contention free random access resources based on a condition of the first UE, where the request includes an indication of the condition. In some cases, the request includes an indication of the contention based random access configuration of the first UE, the low power capability of the first UE, the capability of the first UE to communicate with the second UE over a device-to-device link, or some combination thereof.

In some cases, the condition includes an initial access from idle mode condition, a radio resource connection re-establishment procedure for radio link failure recovery, a downlink data arrival during connected mode when uplink synchronization is lost when contention free random access is not configured, an uplink data arrival during connected mode when uplink synchronization is lost when contention free random access is not configured, uplink data arrival during connected mode when a physical uplink control channel resource for a scheduling request is unavailable, a scheduling request failure, a request by radio resource control upon synchronous reconfiguration for handover when contention free random access is not configured for handover, a transition from a first UE inactive mode, an establishment of time alignment for a secondary timing advance group, a request for other system information, a beam failure recovery when contention free random access are not configured for beam failure recovery, or some combination thereof.

Figure 12:
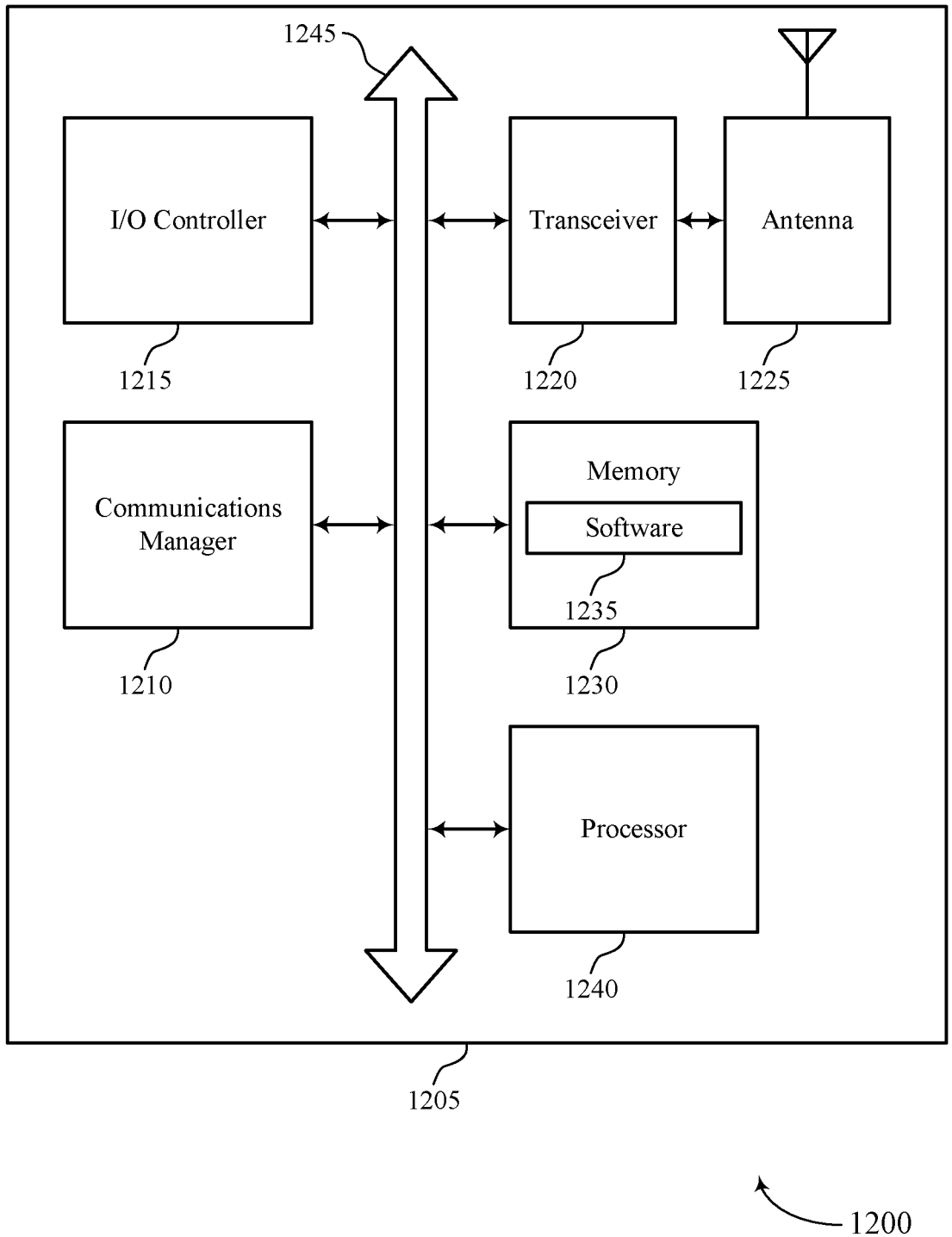
FIG. 12 shows a diagram of a system including a device that supports random access channel procedures with external assistance in accordance with aspects of the present disclosure.

FIG. 12 shows a diagram of a system 1200 including a device 1205 that supports random access channel procedures with external assistance in accordance with aspects of the present disclosure. The device 1205 may be an example of or include the components of device 905, device 1005, or a device as described herein. The device 1205 may include components for bi-directional voice and data communications including components for transmitting and receiving communications, including a communications manager 1210, an I/O controller 1215, a transceiver 1220, an antenna 1225, memory 1230, a processor 1240, and a coding manager 1250. These components may be in electronic communication via one or more buses (e.g., bus 1245).

The communications manager 1210 may transmit a request for contention free random access resources to a second UE based on a low power capability of the first UE, receive a contention free random access configuration based on the request, and perform a contention free random access procedure with a base station based on the received contention free random access configuration.

The I/O controller 1215 may manage input and output signals for the device 1205. The I/O controller 1215 may also manage peripherals not integrated into the device 1205. In some cases, the I/O controller 1215 may represent a physical connection or port to an external peripheral. In some cases, the I/O controller 1215 may utilize an operating system such as iOS®, ANDROID®, MS-DOS®, MS-WINDOWS®, OS/2®, UNIX®, LINUX®, or another known operating system. In other cases, the I/O controller 1215 may represent or interact with a modem, a keyboard, a mouse, a touchscreen, or a similar device. In some cases, the I/O controller 1215 may be implemented as part of a processor. In some cases, a user may interact with the device 1205 via the I/O controller 1215 or via hardware components controlled by the I/O controller 1215.

The transceiver 1220 may communicate bi-directionally, via one or more antennas, wired, or wireless links as described above. For example, the transceiver 1220 may represent a wireless transceiver and may communicate bi-directionally with another wireless transceiver. The transceiver 1220 may also include a modem to modulate the packets and provide the modulated packets to the antennas for transmission, and to demodulate packets received from the antennas.

In some cases, the wireless device may include a single antenna 1225. However, in some cases the device may have more than one antenna 1225, which may be capable of concurrently transmitting or receiving multiple wireless transmissions.

The memory 1230 may include RAM and ROM. The memory 1230 may store computer-readable, computer-executable code or software 1235 including instructions that, when executed, cause the processor to perform various functions described herein. In some cases, the memory 1230 may contain, among other things, a BIOS which may control basic hardware or software operation such as the interaction with peripheral components or devices.

The processor 1240 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1240 may be configured to operate a memory array using a memory controller. In other cases, a memory controller may be integrated into the processor 1240. The processor 1240 may be configured to execute computer-readable instructions stored in a memory (e.g., the memory 1230) to cause the device 1205 to perform various functions (e.g., functions or tasks supporting random access channel procedures with external assistance).

The software 1235 may include instructions to implement aspects of the present disclosure, including instructions to support wireless communications. The software 1235 may be stored in a non-transitory computer-readable medium such as system memory or other type of memory. In some cases, the software 1235 may not be directly executable by the processor 1240 but may cause a computer (e.g., when compiled and executed) to perform functions described herein.

Figure 13:
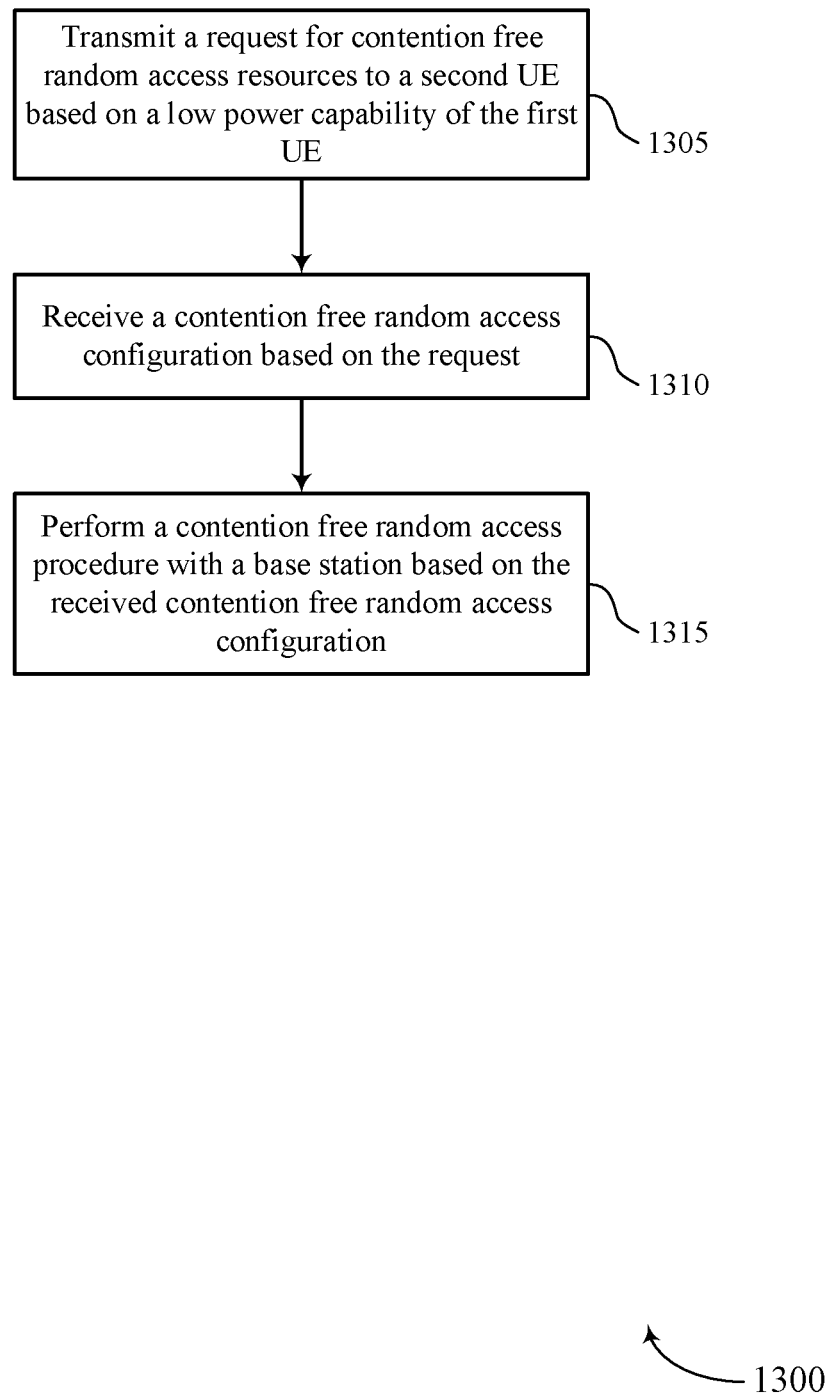
FIGS. 13 through 16 show flowcharts illustrating methods that support random access channel procedures with external assistance in accordance with aspects of the present disclosure.

FIG. 13 shows a flowchart illustrating a method 1300 that supports random access channel procedures with external assistance in accordance with aspects of the present disclosure. The operations of method 1300 may be implemented by a low complexity UE 140 or its components as described herein. For example, the operations of method 1300 may be performed by a communications manager as described with reference to FIGS. 9 through 12. In some examples, a low complexity UE 140 may execute a set of instructions to control the functional elements of the low complexity UE 140 to perform the functions described below. Additionally or alternatively, a low complexity UE 140 may perform aspects of the functions described below using special-purpose hardware.

At 1305, the low complexity UE 140 may transmit a request for contention free random access resources to a second UE based on a low power capability of the first UE. The operations of 1305 may be performed according to the methods described herein. In some examples, aspects of the operations of 1305 may be performed by a CFRA request manager as described with reference to FIGS. 9 through 12.

At 1310, the low complexity UE 140 may receive a contention free random access configuration based on the request. The operations of 1310 may be performed according to the methods described herein. In some examples, aspects of the operations of 1310 may be performed by a CFRA configuration manager as described with reference to FIGS. 9 through 12.

At 1315, the low complexity UE 140 may perform a contention free random access procedure with a base station based on the received contention free random access configuration. The operations of 1315 may be performed according to the methods described herein. In some examples, aspects of the operations of 1315 may be performed by a CFRA procedure manager as described with reference to FIGS. 9 through 12.

Figure 14:
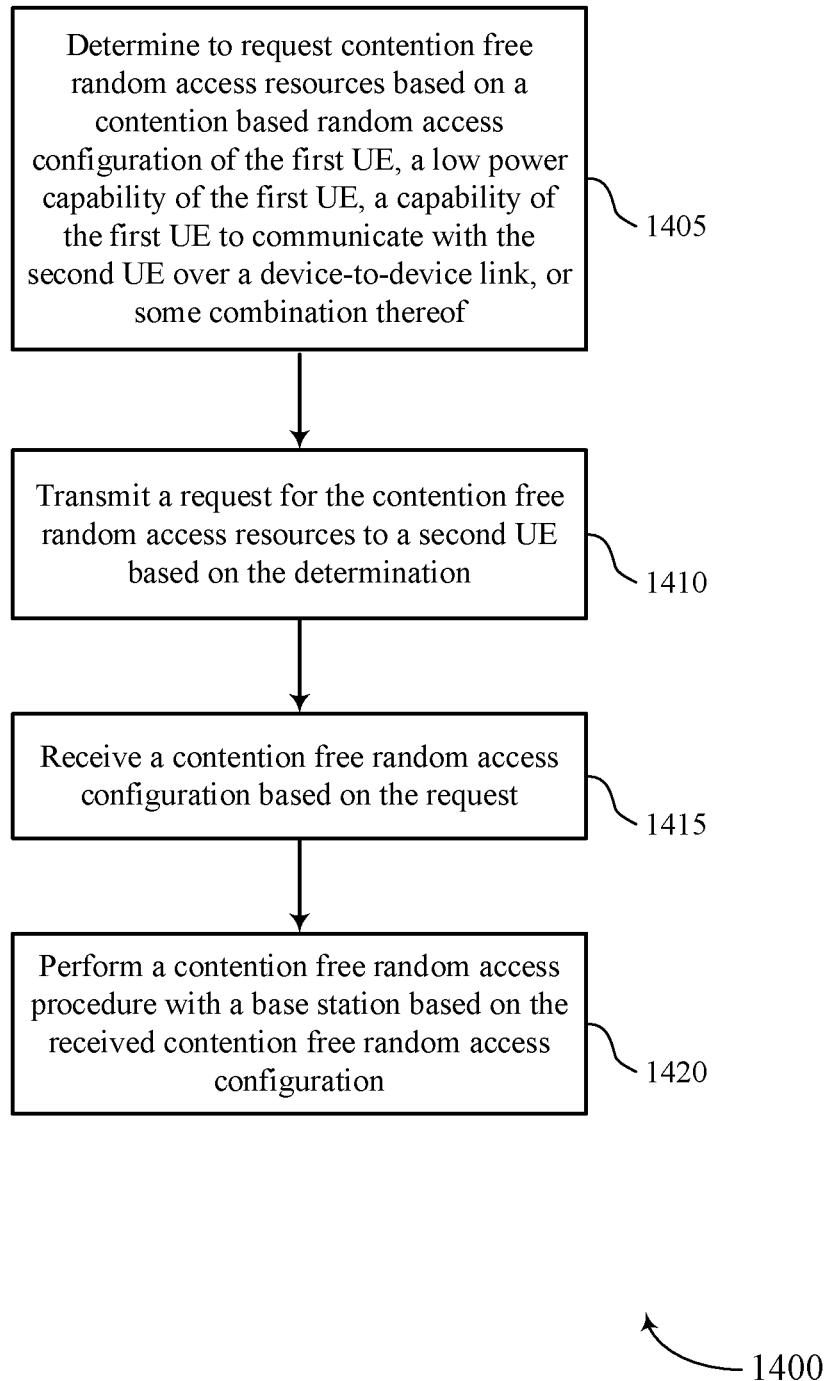

FIG. 14 shows a flowchart illustrating a method 1400 that supports random access channel procedures with external assistance in accordance with aspects of the present disclosure. The operations of method 1400 may be implemented by a device or its components as described herein. For example, the operations of method 1400 may be performed by a communications manager as described with reference to FIGS. 9 through 12. In some examples, a device (e.g., low complexity UE 140) may execute a set of instructions to control the functional elements of the device to perform the functions described below. Additionally or alternatively, a device may perform aspects of the functions described below using special-purpose hardware.

At 1405, the device may determine to request contention free random access resources based on a contention based random access configuration of the first UE, a low power capability of the first UE, a capability of the first UE to communicate with the second UE over a device-to-device link, or some combination thereof, where the request is transmitted based on the determination. The operations of 1405 may be performed according to the methods described herein. In some examples, aspects of the operations of 1405 may be performed by a random access manager as described with reference to FIGS. 9 through 12.

At 1410, the device may transmit a request for the contention free random access resources to a second UE based on the determination. The operations of 1410 may be performed according to the methods described herein. In some examples, aspects of the operations of 1410 may be performed by a CFRA request manager as described with reference to FIGS. 9 through 12.

At 1415, the device may receive a contention free random access configuration based on the request. The operations of 1415 may be performed according to the methods described herein. In some examples, aspects of the operations of 1415 may be performed by a CFRA configuration manager as described with reference to FIGS. 9 through 12.

At 1420, the device may perform a contention free random access procedure with a base station based on the received contention free random access configuration. The operations of 1420 may be performed according to the methods described herein. In some examples, aspects of the operations of 1420 may be performed by a CFRA procedure manager as described with reference to FIGS. 9 through 12.

Figure 15:
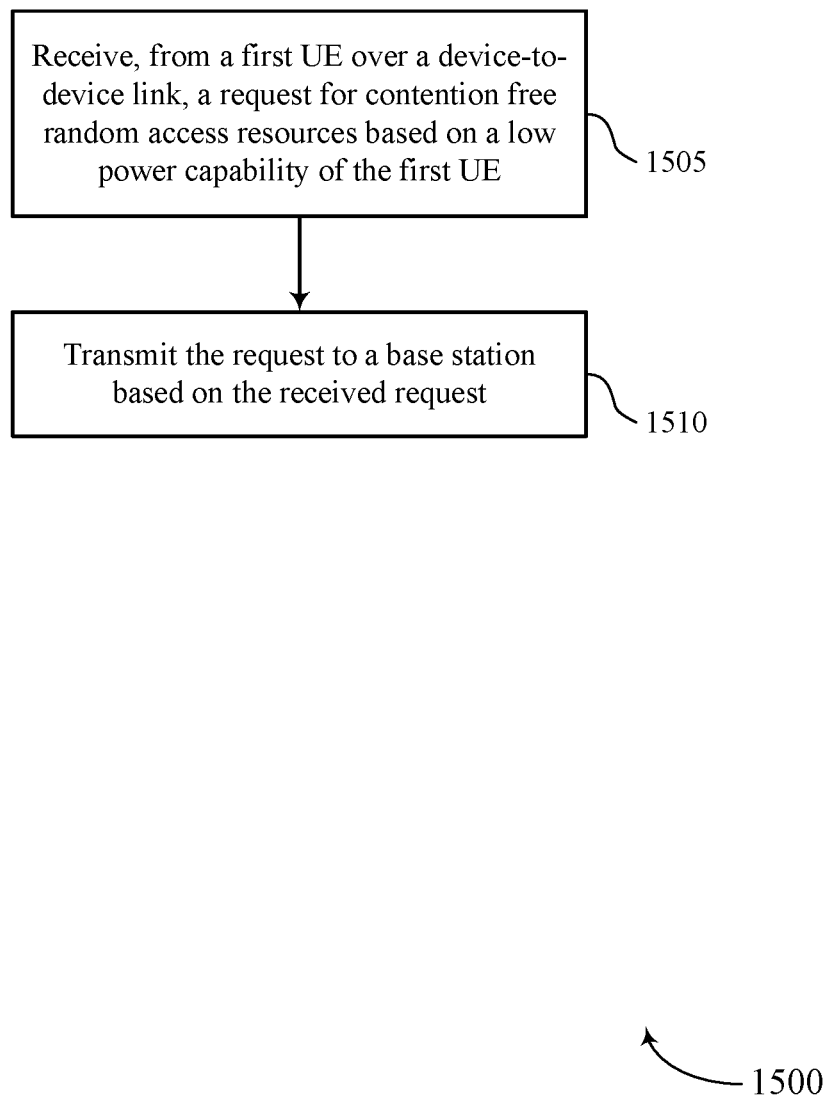

FIG. 15 shows a flowchart illustrating a method 1500 that supports random access channel procedures with external assistance in accordance with aspects of the present disclosure. The operations of method 1500 may be implemented by a UE 115 or its components as described herein. For example, the operations of method 1500 may be performed by a communications manager as described with reference to FIGS. 5 through 8. In some examples, a UE may execute a set of instructions to control the functional elements of the UE to perform the functions described below. Additionally or alternatively, a UE may perform aspects of the functions described below using special-purpose hardware.

At 1505, the UE may receive, from a first UE over a device-to-device link, a request for contention free random access resources based on a low power capability of the first UE. The operations of 1505 may be performed according to the methods described herein. In some examples, aspects of the operations of 1505 may be performed by a CFRA request manager as described with reference to FIGS. 5 through 8.

At 1510, the UE may transmit the request to a base station based on the received request. The operations of 1510 may be performed according to the methods described herein. In some examples, aspects of the operations of 1510 may be performed by a CFRA request manager as described with reference to FIGS. 5 through 8.

Figure 16:
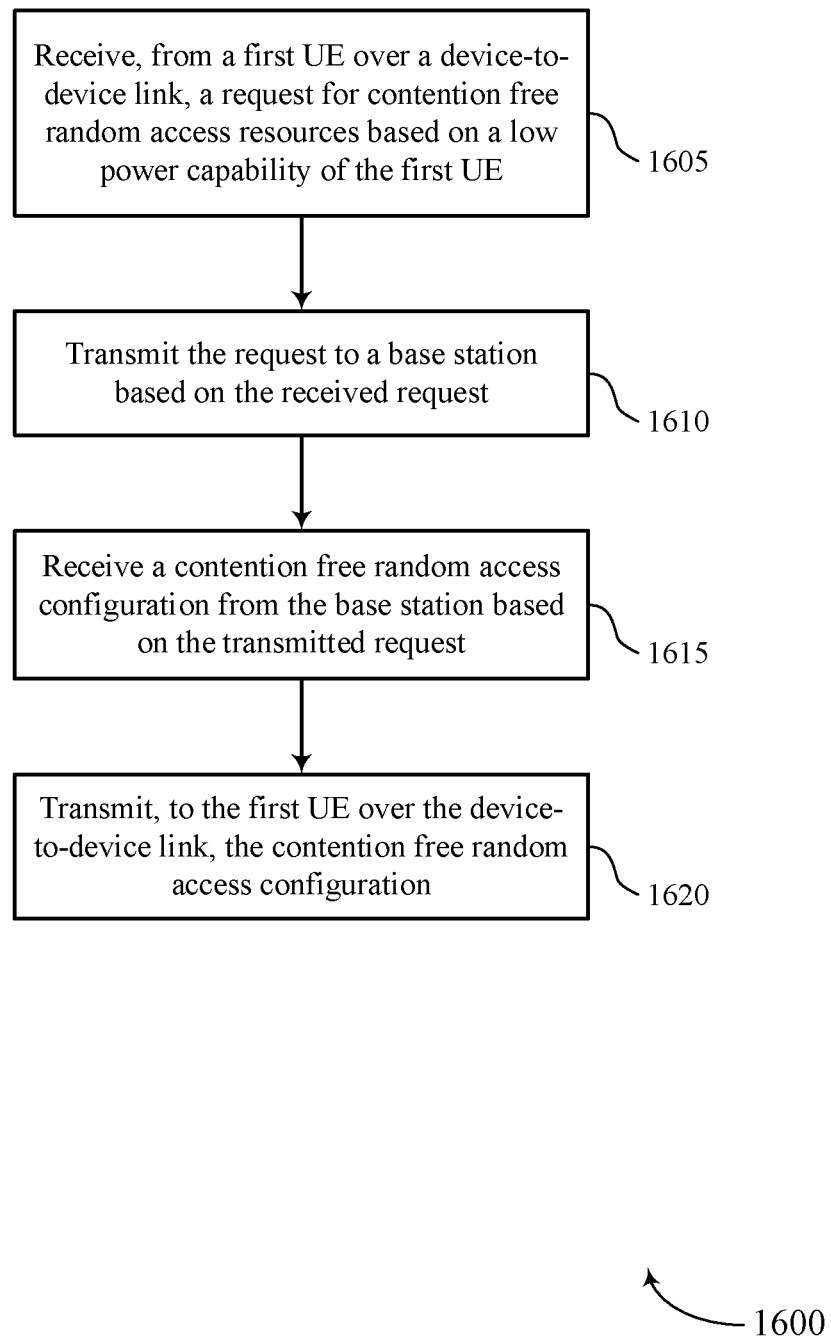

FIG. 16 shows a flowchart illustrating a method 1600 that supports random access channel procedures with external assistance in accordance with aspects of the present disclosure. The operations of method 1600 may be implemented by a UE 115 or its components as described herein. For example, the operations of method 1600 may be performed by a communications manager as described with reference to FIGS. 5 through 8. In some examples, a UE may execute a set of instructions to control the functional elements of the UE to perform the functions described below. Additionally or alternatively, a UE may perform aspects of the functions described below using special-purpose hardware.

At 1605, the UE may receive, from a first UE over a device-to-device link, a request for contention free random access resources based on a low power capability of the first UE. The operations of 1605 may be performed according to the methods described herein. In some examples, aspects of the operations of 1605 may be performed by a CFRA request manager as described with reference to FIGS. 5 through 8.

At 1610, the UE may transmit the request to a base station based on the received request. The operations of 1610 may be performed according to the methods described herein. In some examples, aspects of the operations of 1610 may be performed by a CFRA request manager as described with reference to FIGS. 5 through 8.

At 1615, the UE may receive a contention free random access configuration from the base station based on the transmitted request. The operations of 1615 may be performed according to the methods described herein. In some examples, aspects of the operations of 1615 may be performed by a CFRA configuration manager as described with reference to FIGS. 5 through 8.

At 1620, the UE may transmit, to the first UE over the device-to-device link, the contention free random access configuration. The operations of 1620 may be performed according to the methods described herein. In some examples, aspects of the operations of 1620 may be performed by a CFRA configuration manager as described with reference to FIGS. 5 through 8.

It should be noted that the methods described herein describe possible implementations, and that the operations and the steps may be rearranged or otherwise modified and that other implementations are possible. Further, aspects from two or more of the methods may be combined.

Techniques described herein may be used for various wireless communications systems such as code division multiple access (CDMA), time division multiple access (TDMA), frequency division multiple access (FDMA), orthogonal frequency division multiple access (OFDMA), single carrier frequency division multiple access (SC-FDMA), and other systems. A CDMA system may implement a radio technology such as CDMA2000, Universal Terrestrial Radio Access (UTRA), etc. CDMA2000 covers IS-2000, IS-95, and IS-856 standards. IS-2000 Releases may be commonly referred to as CDMA2000 1x, 1x, etc. IS-856 (TIA-856) is commonly referred to as CDMA2000 1xEV-DO, High Rate Packet Data (HRPD), etc. UTRA includes Wideband CDMA (WCDMA) and other variants of CDMA. A TDMA system may implement a radio technology such as Global System for Mobile Communications (GSM).

An OFDMA system may implement a radio technology such as Ultra Mobile Broadband (UMB), Evolved UTRA (E-UTRA), Institute of Electrical and Electronics Engineers (IEEE) 802.11 (Wi-Fi), IEEE 802.16 (WiMAX), IEEE 802.20, Flash-OFDM, etc. UTRA and E-UTRA are part of Universal Mobile Telecommunications System (UMTS). LTE, LTE-A, and LTE-A Pro are releases of UMTS that use E-UTRA. UTRA, E-UTRA, UMTS, LTE, LTE-A, LTE-A Pro, NR, and GSM are described in documents from the organization named "3rd Generation Partnership Project" (3GPP). CDMA2000 and UMB are described in documents from an organization named "3rd Generation Partnership Project 2" (3GPP2). The techniques described herein may be used for the systems and radio technologies mentioned herein as well as other systems and radio technologies. While aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR applications.

A macro cell generally covers a relatively large geographic area (e.g., several kilometers in radius) and may allow unrestricted access by UEs with service subscriptions with the network provider. A small cell may be associated with a lower-powered base station, as compared with a macro cell, and a small cell may operate in the same or different (e.g., licensed, unlicensed, etc.) frequency bands as macro cells. Small cells may include pico cells, femto cells, and micro cells according to various examples. A pico cell, for example, may cover a small geographic area and may allow unrestricted access by UEs with service subscriptions with the network provider. A femto cell may also cover a small geographic area (e.g., a home) and may provide restricted access by UEs having an association with the femto cell (e.g., UEs in a closed subscriber group (CSG), UEs for users in the home, and the like). An eNB for a macro cell may be referred to as a macro eNB. An eNB for a small cell may be referred to as a small cell eNB, a pico eNB, a femto eNB, or a home eNB. An eNB may support one or multiple (e.g., two, three, four, and the like) cells, and may also support communications using one or multiple component carriers.

The wireless communications systems described herein may support synchronous or asynchronous operation. For synchronous operation, the base stations may have similar frame timing, and transmissions from different base stations may be approximately aligned in time. For asynchronous operation, the base stations may have different frame timing, and transmissions from different base stations may not be aligned in time. The techniques described herein may be used for either synchronous or asynchronous operations.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a DSP, an ASIC, an FPGA, or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein can be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media may include random-access memory (RAM), read-only memory (ROM), electrically erasable programmable ROM (EEPROM), flash memory, compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on."

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "exemplary" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and devices are shown in block diagram form in order to avoid obscuring the concepts of the described examples.

The description herein is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. An apparatus for wireless communication at a first user equipment (UE), comprising:
a processor;
memory coupled with the processor; and
instructions stored in the memory and executable by the processor to cause the apparatus to:
transmit a request for contention free random access resources to a second UE based at least in part on a low power capability of the first UE;
receive a contention free random access configuration based at least in part on the request; and
perform a contention free random access procedure with a network entity based at least in part on the received contention free random access configuration.

2. The apparatus of claim 1, wherein the instructions are further executable by the processor to cause the apparatus to:
determine to request the contention free random access resources based at least in part on a contention based random access configuration of the first UE, the low power capability of the first UE, a capability of the first UE to communicate with the second UE over a device-to-device link, or some combination thereof, wherein the request is transmitted based at least in part on the determination.

3. The apparatus of claim 2, wherein the request includes an indication of the contention based random access configuration of the first UE, the low power capability of the first UE, the capability of the first UE to communicate with the second UE over a device-to-device link, or some combination thereof.

4. The apparatus of claim 1, wherein the instructions to receive the contention free random access configuration are executable by the processor to cause the apparatus to:
receive the contention free random access configuration from the second UE.

5. The apparatus of claim 1, wherein the instructions to receive the contention free random access configuration are executable by the processor to cause the apparatus to:
receive the contention free random access configuration from the network entity.

6. The apparatus of claim 1, wherein the instructions to receive the contention free random access configuration are executable by the processor to cause the apparatus to:
receive the contention free random access configuration from a third UE.

7. The apparatus of claim 1, wherein the request comprises an identifier of the first UE and the contention free random access configuration is received by the first UE based at least in part on the identifier.

8. The apparatus of claim 7, wherein the identifier comprises a cell radio network temporary identifier of the first UE.

9. The apparatus of claim 1, wherein the contention free random access configuration comprises a random access time resource, a random access frequency resource, a random access preamble, a random access occasion, or some combination thereof.

10. The apparatus of claim 9, wherein the contention free random access configuration comprises one or more synchronization signal block indices, one or more channel state information reference signal resource identifications, or some combination thereof associated with the random access time resource, the random access frequency resource, the random access preamble, the random access occasion, or some combination thereof.

11. The apparatus of claim 1, wherein the instructions are further executable by the processor to cause the apparatus to:
determine a preferred random access resource, a preferred random access preamble, a preferred random access occasion, or some combination thereof, wherein the request comprises an indication of the preferred random access resource, the preferred random access preamble, the preferred random access occasion, or some combination thereof.

12. The apparatus of claim 11, wherein the instructions are further executable by the processor to cause the apparatus to:
determine one or more preferred synchronization signal block indices, one or more channel state information reference signal resource identifications, or some combination thereof associated with the preferred random access resource, the preferred random access preamble, the preferred random access occasion, or some combination thereof, wherein the request comprises the determined one or more preferred synchronization signal block indices, the one or more channel state information reference signal resource identifications, or some combination thereof.

13. The apparatus of claim 1, wherein the instructions are further executable by the processor to cause the apparatus to:
determine whether the contention free random access resources are for a four-step random access channel procedure, a two-step random access channel procedure, or both, wherein the request includes an indication of the determination.

14. The apparatus of claim 1, wherein the contention free random access configuration comprises an indication of whether the contention free random access configuration is for a four-step random access channel procedure, a two-step random access channel procedure, or both.

15. The apparatus of claim 1, wherein the instructions to perform the contention free random access procedure with the network entity are executable by the processor to cause the apparatus to:
transmit a random access channel preamble at a random access occasion based at least in part on the received contention free random access configuration.

16. The apparatus of claim 1, wherein the instructions are further executable by the processor to cause the apparatus to:
determine to request the contention free random access resources based at least in part on a condition of the first UE, wherein the request includes an indication of the condition.

17. The apparatus of claim 16, wherein the condition comprises an initial access from idle mode condition, a radio resource connection re-establishment procedure for radio link failure recovery, a downlink data arrival during connected mode when uplink synchronization is lost when contention free random access is not configured, an uplink data arrival during connected mode when uplink synchronization is lost when contention free random access is not configured, uplink data arrival during connected mode when a physical uplink control channel resource for a scheduling request is unavailable, a scheduling request failure, a request by radio resource control upon synchronous reconfiguration for handover when contention free random access is not configured for handover, a transition from a first UE inactive mode, an establishment of time alignment for a secondary timing advance group, a request for other system information, a beam failure recovery when contention free random access are not configured for beam failure recovery, or some combination thereof.

18. The apparatus of claim 1, wherein the request is transmitted over a device-to-device link with the second UE.

19. An apparatus for wireless communication at a second user equipment (UE), comprising:
a processor,
memory coupled with the processor; and
instructions stored in the memory and executable by the processor to cause the apparatus to:
receive, from a first UE over a device-to-device link, a request for contention free random access resources based at least in part on a low power capability of the first UE; and
transmit the request to a network entity based at least in part on the received request.

20. The apparatus of claim 19, wherein the instructions are further executable by the processor to cause the apparatus to:
receive a contention free random access configuration from the network entity based at least in part on the transmitted request; and
transmit, to the first UE over the device-to-device link, the contention free random access configuration.

21. The apparatus of claim 20, wherein the request comprises an identifier of the first UE.

22. The apparatus of claim 21, wherein the identifier of the first UE comprises a cell radio network temporary identifier of the first UE.

23. The apparatus of claim 20, wherein the contention free random access configuration comprises a random access time resource, a random access frequency resource, a random access preamble, a random access occasion, or some combination thereof.

24. The apparatus of claim 23, wherein the contention free random access configuration comprises one or more synchronization signal block indices, one or more channel state information reference signal resource identifications, or some combination thereof associated with the random access time resource, the random access frequency resource, the random access preamble, the random access occasion, or some combination thereof.

25. The apparatus of claim 19, wherein the contention free random access configuration comprises an indication of whether the contention free random access configuration is for a four-step random access channel procedure, a two-step random access channel procedure, or both.

26. The apparatus of claim 19, wherein the request includes an indication of a contention based random access configuration of the first UE, the low power capability of the first UE, a capability of the first UE to communicate with the second UE over the device-to-device link, or some combination thereof.

27. The apparatus of claim 19, wherein the request comprises an indication of a preferred random access resource for the first UE, a preferred random access preamble for the first UE, a preferred random access occasion for the first UE, or some combination thereof.

28. The apparatus of claim 27, wherein the request comprises one or more preferred synchronization signal block indices for the first UE, one or more channel state information reference signal resource identifications for the first UE, or some combination thereof.

29. The apparatus of claim 19, wherein the request includes an indication of whether the contention free random access resources are for a four-step random access channel procedure, a two-step random access channel procedure, or both.

30. The apparatus of claim 19, wherein the request includes an indication a condition of the first UE.

31. The apparatus of claim 30, wherein the condition comprises an initial access from idle mode condition, a radio resource connection re-establishment procedure for radio link failure recovery, a downlink data arrival during connected mode when uplink synchronization is lost when contention free random access is not configured, an uplink data arrival during connected mode when uplink synchronization is lost when contention free random access is not configured, uplink data arrival during connected mode when a physical uplink control channel resource for a scheduling request is unavailable, a scheduling request failure, a request by radio resource control upon synchronous reconfiguration for handover when contention free random access is not configured for handover, a transition from a first UE inactive mode, an establishment of time alignment for a secondary timing advance group, a request for other system information, a beam failure recovery when contention free random access are not configured for beam failure recovery, or some combination thereof.

32. A method for wireless communication at a first user equipment (UE), comprising:
transmitting a request for contention free random access resources to a second UE based at least in part on a low power capability of the first UE;
receiving a contention free random access configuration based at least in part on the request; and
performing a contention free random access procedure with a network entity based at least in part on the received contention free random access configuration.

33. The method of claim 32, further comprising:
determining to request the contention free random access resources based at least in part on a contention based random access configuration of the first UE, the low power capability of the first UE, a capability of the first UE to communicate with the second UE over a device-to-device link, or some combination thereof, wherein the request is transmitted based at least in part on the determination.

34. A method for wireless communication at a second user equipment (UE), comprising:
receiving, from a first UE over a device-to-device link, a request for contention free random access resources based at least in part on a low power capability of the first UE; and
transmitting the request to a network entity based at least in part on the received request.

35. An apparatus for wireless communication at a first user equipment (UE), comprising:
means for transmitting a request for contention free random access resources to a second UE based at least in part on a low power capability of the first UE;
means for receiving a contention free random access configuration based at least in part on the request; and
means for performing a contention free random access procedure with a network entity based at least in part on the received contention free random access configuration.

* * * * *